(12) United States Patent
Li et al.

(10) Patent No.: US 11,789,464 B2
(45) Date of Patent: Oct. 17, 2023

(54) MOBILE ROBOT ORBITING PHOTOGRAPHY PATH CONTROL METHODS AND APPARATUSES

(71) Applicant: SZ DJI TECHNOLOGY CO., LTD., Shenzhen (CN)

(72) Inventors: Jinsong Li, Shenzhen (CN); You Zhou, Shenzhen (CN); Jie Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 392 days.

(21) Appl. No.: 17/123,125

(22) Filed: Dec. 16, 2020

(65) Prior Publication Data

US 2021/0103293 A1  Apr. 8, 2021

Related U.S. Application Data

(63) Continuation of application No. PCT/CN2018/096534, filed on Jul. 20, 2018.

(51) Int. Cl.
*G05D 1/08* (2006.01)
*B64C 39/02* (2023.01)
(Continued)

(52) U.S. Cl.
CPC ......... *G05D 1/0808* (2013.01); *B64C 39/024* (2013.01); *B64D 47/08* (2013.01);
(Continued)

(58) Field of Classification Search
CPC ............. B60W 60/001; B60W 40/068; B60W 40/107; B60W 40/109; B60W 2555/20;
(Continued)

(56) References Cited

U.S. PATENT DOCUMENTS

2011/0090337 A1* 4/2011 Klomp ................ G01C 11/025
                                                                                          348/E7.085
2017/0244937 A1* 8/2017 Meier .................... G06V 20/17
(Continued)

FOREIGN PATENT DOCUMENTS

CN   102937443 A    2/2013
CN   106909172 A *  6/2017
(Continued)

OTHER PUBLICATIONS

Machine Translation of CN 106909172 A (Year: 2017).*
International Search Report of PCT/CN2018/096534 (dated Apr. 24, 2019).

*Primary Examiner* — Navid Z. Mehdizadeh
*Assistant Examiner* — Kenneth M Dunne
(74) *Attorney, Agent, or Firm* — FIDELI LAW PLLC

(57) ABSTRACT

A control method for a mobile robot includes: obtaining indication information of a target object, wherein the indication information includes position information of the target object in a reference image output by a photographic apparatus of a mobile robot; determining the position information of the target object according to the indication information; and controlling, according to the position information of the target object, the mobile robot to move around the target object. With the provided control methods and apparatuses, devices, and storage media, the mobile robot may move around the target object without needing to move to a circling center to record a position of the circling center.

20 Claims, 11 Drawing Sheets

(51) Int. Cl.
   *B64D 47/08* (2006.01)
   *G05D 1/02* (2020.01)
   *B64U 10/13* (2023.01)
   *B64U 101/30* (2023.01)

(52) U.S. Cl.
   CPC ........... *G05D 1/0202* (2013.01); *B64U 10/13* (2023.01); *B64U 2101/30* (2023.01); *B64U 2201/10* (2023.01)

(58) Field of Classification Search
   CPC ....... B60W 2520/06; B60W 2520/105; B60W 2520/125; G07C 5/02
   See application file for complete search history.

(56) References Cited

U.S. PATENT DOCUMENTS

2018/0165970 A1   6/2018  Namgoong et al.
2018/0284777 A1*  10/2018 Li .......................... G06V 20/13

FOREIGN PATENT DOCUMENTS

| | | |
|---|---|---|
| CN | 106909172 A | 6/2017 |
| CN | 107168362 A | 9/2017 |
| CN | 107703970 A | 2/2018 |
| CN | 107885096 A | 4/2018 |
| JP | 2006082774 A | 3/2006 |

\* cited by examiner

US 11,789,464 B2

MOBILE ROBOT ORBITING PHOTOGRAPHY PATH CONTROL METHODS AND APPARATUSES

RELATED APPLICATIONS

The present patent document is a continuation of PCT Application Serial No. PCT/CN2018/096534, filed Jul. 20, 2018, designating the United States and published in English, the content of which is herein incorporated by reference in its entirety.

BACKGROUND

1. Technical Field Text

The present disclosure relates to the technical field of control, and in particular, to control methods and apparatuses for mobile robots, devices, and storage media.

2. Background Information

Normally, a mobile robot (such as an unmanned aerial vehicle (UAV) or an unmanned ground robot) is equipped with a photographic apparatus, and the photographic apparatus may photograph a target object during the movement of the mobile robot.

Orbit shooting around a target object is a photographing method. In some exemplary embodiments, the UAV is used as an example. The UAV needs to fly directly above the target object. A circling center of the UAV is set directly above the target object. A user needs to instruct the UAV through a control terminal to record a position of the circling center (for example, record a GPS position of the circling center). Further, the UAV flies away from the circling center and arrives at a preset position, to fly around by using the circling center as a center of a circle and a distance between the UAV and the circling center as a radius. Currently, an operation process of moving around the target object is cumbersome. In addition, there may be some dangers or interference during the movement of the mobile robot to the circling center, making the mobile robot susceptible to safety incidents.

BRIEF SUMMARY

The present disclosure provides control methods and apparatuses for a mobile robot, devices, and storage media that can simplify the movement of the mobile robot around the target object, and improve the operation security of the mobile robot.

A first aspect of the present disclosure refers to a control method for a mobile robot. The control method may comprise: obtaining indication information of a target object, wherein the indication information includes position information of the target object in a reference image output by a photographic apparatus of a mobile robot; determining the position information of the target object according to the indication information; and controlling, according to the position information of the target object, the mobile robot to move around the target object.

A second aspect of the present disclosure refers to a control apparatus for a mobile robot. The control apparatus may comprise: at least one storage medium storing a set of program code for controlling a mobile robot; and at least one processor in communication with the at least one storage medium, wherein during operation the at least one processor executes the set of program codes to: obtain indication information of a target object, wherein the indication information includes position information of the target object in a reference image output by a photographic apparatus of a mobile robot; determine the position information of the target object according to the indication information; and controlling, according to the position information of the target object, the mobile robot to move around the target object.

With the control methods and apparatuses for a mobile robot, devices, and storage media provided by the present disclosure obtains position information of the target object in a reference image output by a photographic apparatus of a mobile robot, determines the position information of the target object according to the indication information, and controls, according to the position information of the target object, the mobile robot to move around the target object, such that the mobile robot may move around the target object without needing to move to a circling center to record a position of the circling center, thereby simplifying a movement of the mobile robot around the target object, and improving the operation security of the mobile robot.

BRIEF DESCRIPTION OF THE DRAWINGS

In order to describe the technical solutions in the exemplary embodiments of the present disclosure more clearly, the accompanying drawings required to describe the exemplary embodiments are briefly described below. Apparently, the accompanying drawings described below are only some exemplary embodiments of the present disclosure. Those of ordinary skill in the art may further obtain other accompanying drawings based on these accompanying drawings without inventive effort.

REFERENCE NUMERALS

Figure 1:
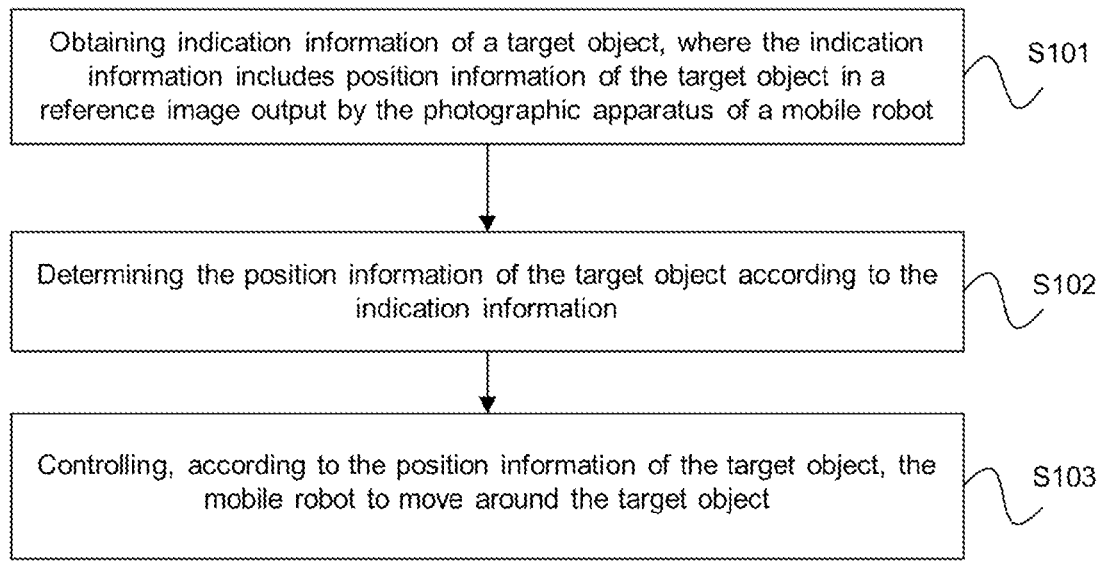
FIG. 1 is a flowchart of a control method for a mobile robot according to some exemplary embodiments of the present disclosure.

20: UAV;
21: Photographic apparatus;
22: Gimbal;
23: Wireless communication interface;
24: Control terminal;
31: Target object;
32: Point;
33: Point;
34: Area;
35: Start control button;
50: Reference object;
51: Head;
53: Circular trajectory;
30: Reference image;
71: First target image;
72: First target image;
73: First target image;
80: Target object;
81: First target image;
82: First target image;
83: First target image;
91: Target trajectory;
121: Second target image;
130: Control apparatus;
131: Memory;
132: Processor;
133: Communication interface;
140: UAV;
141: Motor;
142: Propeller;
143: Electronic speed regulator;
144: Photographic apparatus;
145: Sensing system;
146: Communication system;
147: Support device; and
148: Control apparatus.

DETAILED DESCRIPTION OF THE DRAWINGS

The following clearly describes the technical solutions in the exemplary embodiments of the present disclosure with reference to the accompanying drawings in the exemplary embodiments of the present disclosure. Apparently, the described exemplary embodiments are merely some but not all of the exemplary embodiments of the present disclosure. All other exemplary embodiments obtained by those of ordinary skill in the art based on the exemplary embodiments of the present disclosure without creative efforts shall fall within the protection scope of the present disclosure.

The terminology used herein is for the purpose of describing particular exemplary embodiments only and is not intended to be limiting. When used in this disclosure, the terms "comprise", "comprising", "include" and/or "including" refer to the presence of stated features, integers, steps, operations, elements, and/or components, but do not preclude the presence or addition of one or more other features, integers, steps, operations, elements, components, and/or groups thereof. As used in this disclosure, the term "A on B" means that A is directly adjacent to B (from above or below), and may also mean that A is indirectly adjacent to B (i.e., there is some element between A and B); the term "A in B" means that A is all in B, or it may also mean that A is partially in B.

In view of the following description, these and other features of the present disclosure, as well as operations and functions of related elements of the structure, and the economic efficiency of the combination and manufacture of the components, may be significantly improved. All of these form part of the present disclosure with reference to the drawings. However, it should be clearly understood that the drawings are only for the purpose of illustration and description, and are not intended to limit the scope of the present disclosure. It is also understood that the drawings are not drawn to scale.

In some embodiments, numbers expressing quantities or properties used to describe or define the embodiments of the present application should be understood as being modified by the terms "about", "generally", "approximate," or "substantially" in some instances. For example, "about", "generally", "approximately" or "substantially" may mean a ±20% change in the described value unless otherwise stated. Accordingly, in some embodiments, the numerical parameters set forth in the written description and the appended claims are approximations, which may vary depending upon the desired properties sought to be obtained in a particular embodiment. In some embodiments, numerical parameters should be interpreted in accordance with the value of the parameters and by applying ordinary rounding techniques. Although a number of embodiments of the present application provide a broad range of numerical ranges and parameters that are approximations, the values in the specific examples are as accurate as possible.

Each of the patents, patent applications, patent application publications, and other materials, such as articles, books, instructions, publications, documents, products, etc., cited herein are hereby incorporated by reference, which are applicable to all contents used for all purposes, except for any history of prosecution documents associated therewith, or any identical prosecution document history, which may be inconsistent or conflicting with this document, or any such subject matter that may have a restrictive effect on the broadest scope of the claims associated with this document now or later. For example, if there is any inconsistent or conflicting in descriptions, definitions, and/or use of a term associated with this document and descriptions, definitions, and/or use of the term associated with any materials, the term in this document shall prevail.

It should be understood that the embodiments of the application disclosed herein are merely described to illustrate the principles of the embodiments of the application. Other modified embodiments are also within the scope of this application. Therefore, the embodiments disclosed herein are by way of example only and not limitations. Those skilled in the art may adopt alternative configurations to implement the invention in this application in accordance with the embodiments of the present application. Therefore, the embodiments of the present application are not limited to those embodiments that have been precisely described in this disclosure.

It should be noted that when a component is referred to being "fixed to" another component, it may be directly on another component or a central component may also exist. When a component is considered to be "connected to" another component, it may be directly connected to another component or a central component may also exist.

Unless otherwise defined, all technical and scientific terms used herein have the same meaning as commonly understood by those skilled in the technical field of the present disclosure. The terms used in the specification of the present disclosure herein are only for the purpose of describing specific exemplary embodiments, and are not intended to limit the present disclosure. The term "and/or" used herein may include any and all combinations of one or more related listed items.

The following describes in detail some implementations of the present disclosure with reference to the accompanying drawings. If no conflict occurs, the following exemplary embodiments and features in the exemplary embodiments may be mutually combined.

The exemplary embodiments of the present disclosure provide a control method for a mobile robot. FIG. 1 is a flowchart of a control method for a mobile robot according to some exemplary embodiments of the present disclosure. The control method for a mobile robot described in FIG. 1 may be applied to a mobile robot, which may include a photographic apparatus. As shown in FIG. 1, the method in these exemplary embodiments may include the following steps.

Step S101. Obtaining indication information of a target object, where the indication information includes position information of the target object in a reference image output by the photographic apparatus of a mobile robot.

Figure 2:
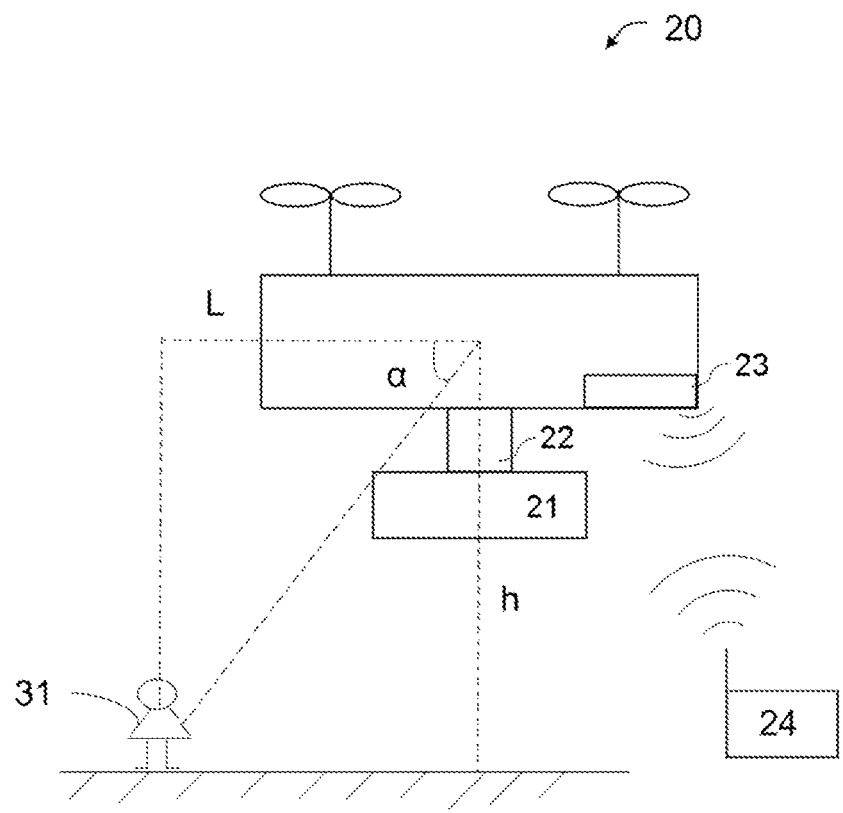
FIG. 2 is a schematic diagram of an application scenario according to some exemplary embodiments of the present disclosure.

In some exemplary embodiments, the mobile robot described in these exemplary embodiments may be a UAV, an unmanned ground robot, an unmanned ship, or the like. For ease of explanation herein, that the mobile robot is a UAV is used as an example for description. It may be understood that, the UAV herein may be equivalently replaced with a mobile robot. As shown in FIG. 2, a UAV 20 may be equipped with a photographic apparatus 21. The photographic apparatus 21 may be a camera, a video camera, or the like. In some exemplary embodiments, the photographic apparatus 21 may be mounted on the UAV 20 through a gimbal 22, or the photographic apparatus 21 may be fixed to the UAV 20 through another fixing apparatus. The photographic apparatus 21 may perform real-time photographing to obtain video data or image data, and send the video data or the image data to a control terminal 24 through a wireless communication interface 23 of the UAV 20. The control terminal 24 may be a remote controller corresponding to the UAV 20, or may be a user terminal such as a smartphone or a tablet computer. In addition, the UAV 20 may further include a control apparatus. The control apparatus may include a general-purpose or dedicated processor. This is only an example description herein, and does not limit a specific structure of the UAV.

In some exemplary embodiments, an image captured by the photographic apparatus 21 may include a target object 31 shown in FIG. 2. Herein, a frame of the image output by the photographic apparatus 21 may be denoted as a reference image. A processor of the UAV 20 may obtain indication information of the target object. The indication information may include position information of the target object in the reference image.

In a possible manner, the obtaining indication information of a target object may include: receiving indication information sent by a control terminal, where the indication information may be determined by the control terminal by detecting a target object selection operation of a user in an interactive interface displaying the reference image.

Figure 3:
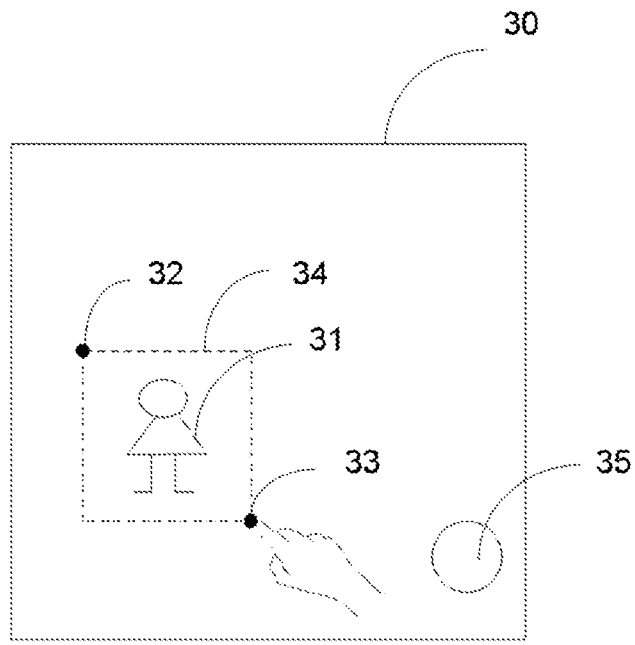
FIG. 3 is a schematic diagram of a reference image according to some exemplary embodiments of the present disclosure.

In some exemplary embodiments, after outputting the reference image, the photographic apparatus 21 may send the reference image to the control terminal 24 through the wireless communication interface 23. The control terminal 24 may display the reference image in the interactive interface, so that the user may select the target object from the reference image in the interactive interface. As shown in FIG. 3, 30 may represent the reference image displayed in the interactive interface. The reference image 30 may include the target object 31. A possible manner in which the user selects the target object 31 in the interactive interface may be that the user selects a point 32 and starts to slide from the point 32 to a point 33. This is only an example description herein, and no specific selection operation is limited in these exemplary embodiments. The control terminal 24 may determine, according to a selection operation performed by the user in the interactive interface, an area 34 box-selected by the user in the interactive interface, and determine position information of the area 34 in the reference image 30. For example, the control terminal 24 may determine position information of an upper left corner of the area 34, that is, the point 32, in the reference image 30 and a size of the area 34, for example, length and width. In some exemplary embodiments, the control terminal 24 may determine position information of an upper left corner of the area 34, that is, the point 32, in the reference image 30 and position information of a lower right corner of the area 34, that is, the point 33, in the reference image 30. Further, the control terminal 24 may send the position information of the area 34 in the reference image 30 to the UAV 20 as position information of the target object 31 in the reference image 30, that is, the indication information of the target object 31.

In another possible manner, the obtaining of indication information of a target object may include: identifying the target object in the reference image to obtain the indication information of the target object.

In some exemplary embodiments, the processor of the UAV may identify the target object in the reference image output by the photographic apparatus 21, to obtain the indication information of the target object through the identification. Further, the processor of the UAV may input the reference image to a trained neural network model, and obtain the indication information of the target object that is output by the neural network model.

Step S102. Determining the position information of the target object according to the indication information.

In some exemplary embodiments, after obtaining the indication information of the target object, the UAV may determine the position information of the target object according to the indication information. The position information of the target object may be three-dimensional position information or two-dimensional position information. The position information of the target object may be position information based on a world coordinate system. In addition, the position information of the target object may be position information based on a global coordinate system, and the position information may include at least longitude and latitude. Moreover, the position information of the target object may be position information based on a body coordinate system of the UAV.

In an implementable manner, the determining of the position information of the target object according to the indication information may include: determining an orientation of the target object relative to the mobile robot according to the indication information, and determining the position information of the target object according to the orientation and a horizontal distance between the mobile robot and the target object or a value of a height of the mobile robot relative to the ground.

In some exemplary embodiments, an orientation of the target object 31 relative to the UAV 20 may be determined according to the position information of the target object 31 in the reference image 30 and an attitude of the gimbal carrying the photographic apparatus 21. Then, the position information of the target object 31 may be determined according to the orientation and a horizontal distance between the target object 31 and the UAV 20. A field of view (FOV) of the photographic apparatus 21 is known. An angle of the target object 31 relative to an optical axis of the photographic apparatus 21 may be determined according to the position information of the target object 31 in the reference image. For example, if the target object 31 is in the center of the reference image, it may indicate that the angle of the target object 31 relative to the optical axis of the photographic apparatus is 0 degree. If the FOV of the photographic apparatus 21 is 20 degrees in a horizontal direction, and the target object 31 is at the leftmost side of the reference image, it may indicate that a horizontal angle of the target object 31 relative to the optical axis of the photographic apparatus is 10 degrees. A case in a vertical direction is similar thereto, and details are not described herein again. In addition, the attitude of the gimbal 22 of the photographic apparatus 21 may also determine an orientation of the optical axis of the photographic apparatus 21. The orientation of the target object 31 relative to the UAV 20 may be obtained with reference to the angle of the target object 31 relative to the optical axis of the photographic apparatus 21 and the orientation of the optical axis. Further, the position information of the target object 31 may be determined according to the orientation of the target object 31 relative to the UAV 20 and the horizontal distance between the target object 31 and the UAV 20. In some exemplary embodiments, the position information of the target object 31 is determined according to the orientation of the target object 31 relative to the UAV 20 and the horizontal distance between the target object 31 and the UAV 20 or a value of a height of the UAV 20 relative to the ground.

Still referring to FIG. 2, an angle of the target object 31 relative to the UAV 20 in a pitch direction may be determined according to the orientation of the target object 31 relative to the UAV 20, for example, an angle α shown in FIG. 2. Then, the value of the height (for example, h shown in FIG. 2) of the UAV relative to the ground that is measured by a distance sensor disposed on the UAV 20 may be obtained. Position information of the target object relative to the UAV in the vertical direction may be determined according to the angle α and the value of the height relative to the ground. In addition, an angle, for example, an angle β, of the target object 31 relative to the UAV 20 in a yaw direction may further be determined according to the orientation of the target object 31 relative to the UAV 20. The position information of the target object relative to the UAV in the horizontal direction may be determined according to the angle β and the horizontal distance L between the target object 31 and the UAV 20. The position information of the target object relative to the UAV may be determined according to the position information of the target object relative to the UAV in the vertical direction and the position information of the target object relative to the UAV in the horizontal direction. Further, the position information of the target object may be determined according to the position information of the target object relative to the UAV and position information of the UAV. The position information of the target object may be a position of the target object in the world coordinate system, or may be a position of the target object in the global coordinate system.

In addition, in some exemplary embodiments, the position information of the target object relative to the UAV in the vertical direction may alternatively be determined according to the horizontal distance L between the target object 31 and the UAV 20 and the angle α. The indication information of the target object may indicate a size of an image area corresponding to the target object in the reference image. The horizontal distance between the target object 31 and the UAV 20 may be determined according to the size of the image area.

Step S103. Controlling, according to the position information of the target object, the mobile robot to move around the target object.

In some exemplary embodiments, after determining the position information of the target object 31, the processor of the UAV 20 may use the target object 31 as a center, generate an orbit trajectory according to a positional relationship between the UAV 20 and the target object 31, and control the UAV 20 to move on the orbit trajectory, that is, control the UAV 20 to fly on the orbit trajectory, thereby flying around the target object 31. In a process in which the UAV 20 flies around the target object 31, the photographic apparatus 21 may photograph the target object 31 in real time, and send image data or video data obtained through photographing to the control terminal 24 through the wireless communication interface 23, for the user to browse or view.

In these exemplary embodiments, position information of a target object photographed by a photographic apparatus in a reference image output by the photographic apparatus may be obtained, the position information of the target object may be determined, and a mobile robot may be controlled according to the position information of the target object, to move around the target object, so that the mobile robot can move around the target object without needing to move to a circling center to record a position of the circling center, thereby simplifying a process in which the mobile robot moves around the target object, and improving operation security of the mobile robot.

Figure 4:
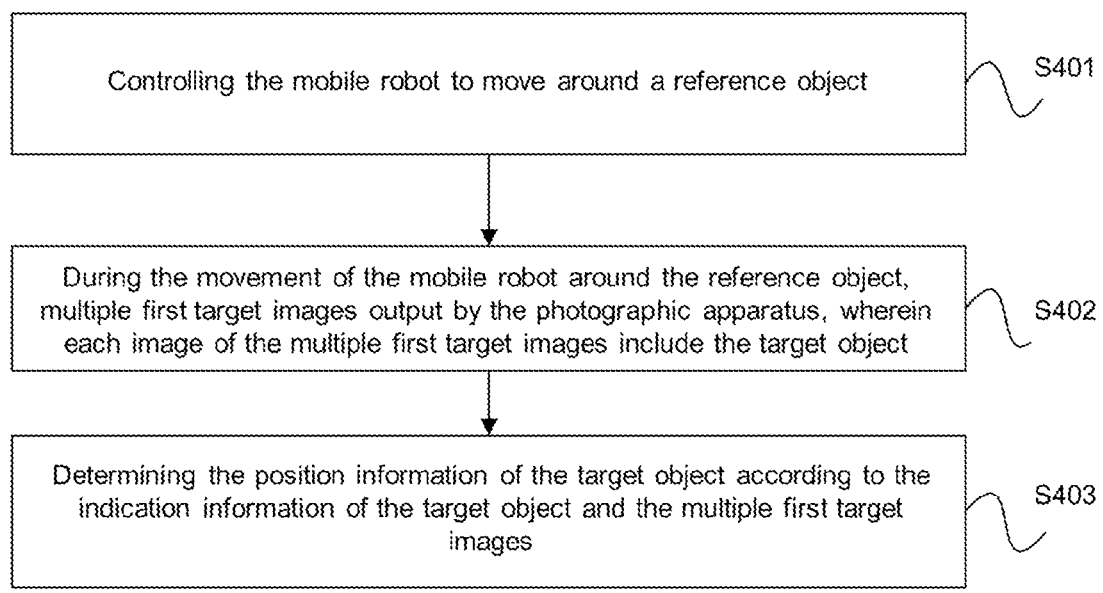
FIG. 4 is a flowchart of a control method for a mobile robot according to some exemplary embodiments of the present disclosure.

The exemplary embodiments of the present disclosure may provide a control method for a mobile robot. FIG. 4 is a flowchart of a control method for a mobile robot according to some exemplary embodiments of the present disclosure. As shown in FIG. 4, based on the embodiment shown in FIG. 1, these embodiments may provide another implementable manner of determining the position information of the target object according to the indication information. In some exemplary embodiments, the determining of the position information of the target object according to the indication information may include the following steps.

Step S401. Controlling the mobile robot to move around a reference object.

Figure 5:
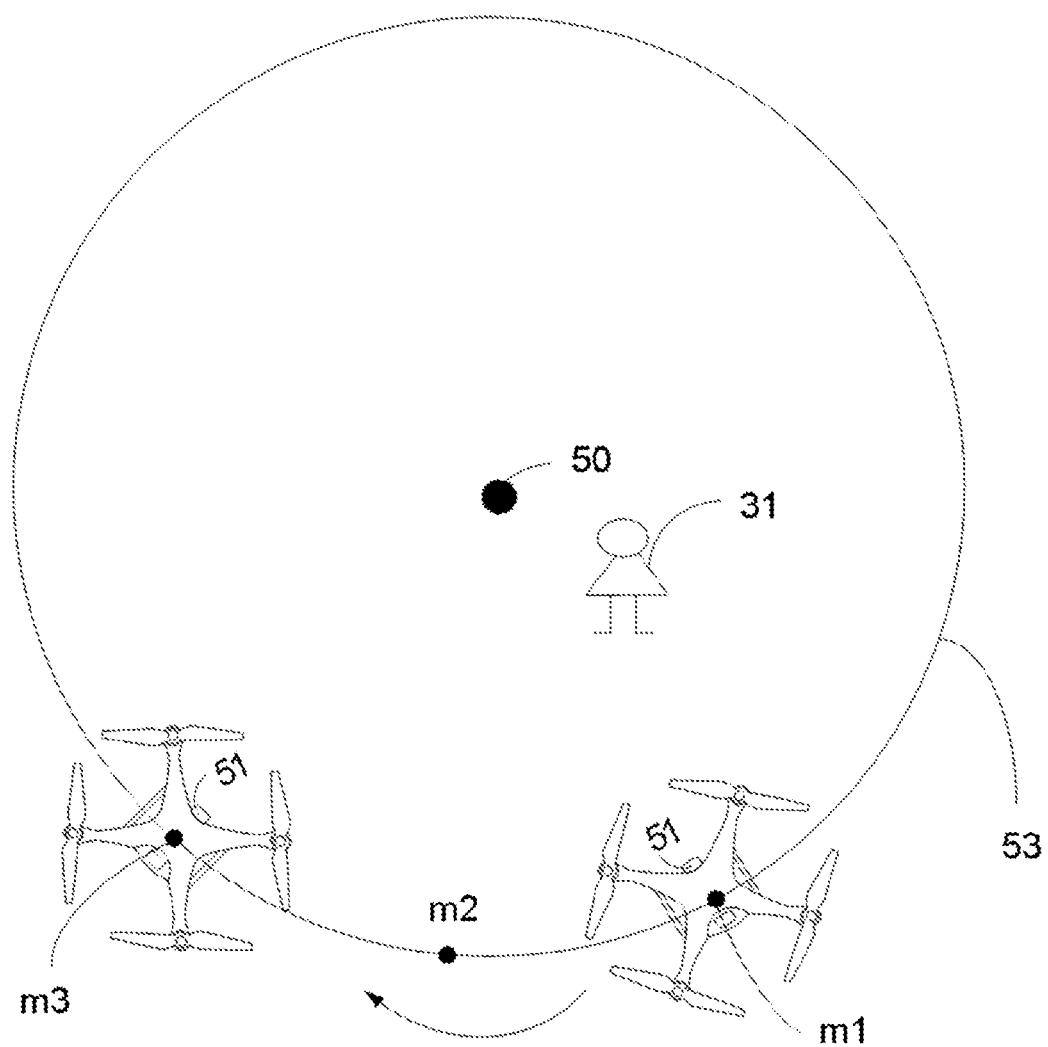
FIG. 5 is a schematic diagram showing that a UAV flies around a reference object according to some exemplary embodiments of the present disclosure.

In these exemplary embodiments, a point at a preset distance directly in front of the UAV may be used as a reference object. The reference object may be a virtual target point, and the UAV may be controlled to fly around the reference object. As shown in FIG. 5, 50 may represent the reference object at the preset distance directly in front of the UAV, 51 may represent the head of the UAV, and the processor inside the UAV may control the UAV to fly around the reference object 50.

In a possible manner, the controlling the mobile robot to move around a reference object may include: determining the reference object according to a preset circling radius, and controlling the mobile robot to move around the reference object.

In some exemplary embodiments, the UAV may be controlled to use the reference object 50 as a circling center and a preset circling radius (for example, 500 meters) as a radius, to generate a circular trajectory, for example, a circular trajectory 53 shown in FIG. 5, and the UAV may be controlled to fly around the reference object 50 on the circular trajectory 53. In some exemplary embodiments, the UAV may fly on the circular trajectory 53 in a counterclockwise direction, or may fly on the circular trajectory 53 in a clockwise direction. In some exemplary embodiments, after receiving the indication information of the target object that is sent by the control terminal, the processor inside the UAV may determine the reference object according to the preset circling radius, and control the UAV to fly around the reference object. In other words, the UAV may fly around the reference object after the user box-selects the target object from the reference image.

In another possible manner, the controlling of the mobile robot to move around a reference object may include: after a start control instruction sent by the control terminal is received, controlling the mobile robot to move around the reference object.

In some exemplary embodiments, as shown in FIG. 3, after the user box-selects the target object 31, the interactive interface may display a start control button 35. The start control button 35 may be an icon in the interactive interface. In other words, after the user box-selects the target object 31, the UAV does not immediately fly around the reference object. Instead, the UAV starts to fly around the reference object after the user taps the start control button 35 in the interactive interface. In some exemplary embodiments, when the user taps the start control button 35 in the interactive interface, the control terminal may generate a start control instruction according to the click operation performed by the user, and send the start control instruction to the UAV. After receiving the start control instruction, the processor inside the UAV may control the UAV to fly around the reference object. A specific manner of controlling the UAV to fly around the reference object may be the manner shown in FIG. 5, and details are not described herein again.

Step S402. During the movement of the mobile robot around the reference object, multiple first target images output by the photographic apparatus, wherein each image of the multiple first target images include the target object.

As shown in FIG. 5, that the UAV flies on the circular trajectory 53 in the clockwise direction is used as an example. During the flight of the UAV around the reference object 50, the photographic apparatus of the UAV may further photograph the target object 31, and output a target image that may include the target object 31. In these exemplary embodiments, the target image photographed during flight of the UAV around the reference object 50 may be denoted as a first target image, and the photographic apparatus of the UAV may output multiple frames of first target images. In some exemplary embodiments, during flight of the UAV around the reference object 50, the processor of the UAV may obtain the multiple frames of first target images output by the photographic apparatus. The first target image may include the target object 31. An angle at which the target object 31 may be offset relative to the optical axis of the photographic apparatus may be not limited herein, as long as it is ensured that the target object 31 is in a shooting screen of the photographic apparatus.

Step S403. Determining the position information of the target object according to the indication information of the target object and the multiple first target images.

The processor of the UAV may determine the position information of the target object 31 according to the indication information of the target object 31 that is obtained in the foregoing embodiment and the multiple frames of first target images obtained in the foregoing step.

Figure 6:
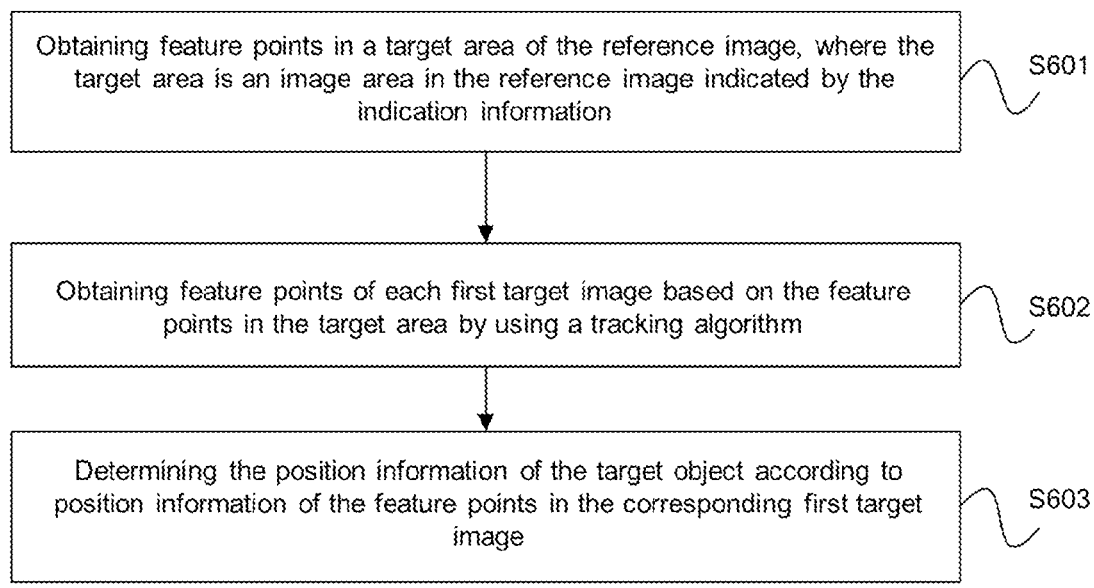
FIG. 6 is a flowchart of a control method for a mobile robot according to some exemplary embodiments of the present disclosure.

In some exemplary embodiments, the determining of the position information of the target object according to the indication information of the target object and the multiple frames of first target images may include the following steps shown in FIG. 6.

Step S601. Obtaining feature points in a target area of the reference image, where the target area is an image area in the reference image indicated by the indication information.

After receiving the indication information of the target object that is sent by the control terminal, the UAV may determine a target area of the reference image according to the indication information of the target object. The target area may be an image area indicated by the indication information. For example, as shown in FIG. 3, after the UAV receives position information that is of the area 34 in the reference image 30 and that is sent by the control terminal or obtains the position information of the area 34 in the reference image 30 through identification, the processor of the UAV may determine a target area in the reference image 30. The target area may be the area 34. In other words, the UAV may use an area box-selected by the user in the interactive interface as the target area. Further, the processor of the UAV may obtain feature points in the target area. In some exemplary embodiments, the processor may determine the feature points in the target area according to a preset feature point extraction algorithm. The feature point extraction algorithm may include at least one of the following: a Harris corner point detection algorithm, the scale-invariant feature transform (SIFT), a speeded-up robust features (SURF) algorithm, the oriented FAST and rotated BRIEF (ORB), and the like. In these exemplary embodiments, the Harris corner point detection algorithm may be used to extract the feature points in the target area.

Step S602. Obtaining feature points of each first target image based on the feature points in the target area by using a tracking algorithm.

After being obtained, the feature points in the target area may be tracked by using the tracking algorithm. In other words, the tracking algorithm may be used to determine positions of the feature points in the target area in each frame of the first target image. The tracking algorithm may be the Kanade-Lucas-Tomasi (KLT) feature tracker.

Figure 7:
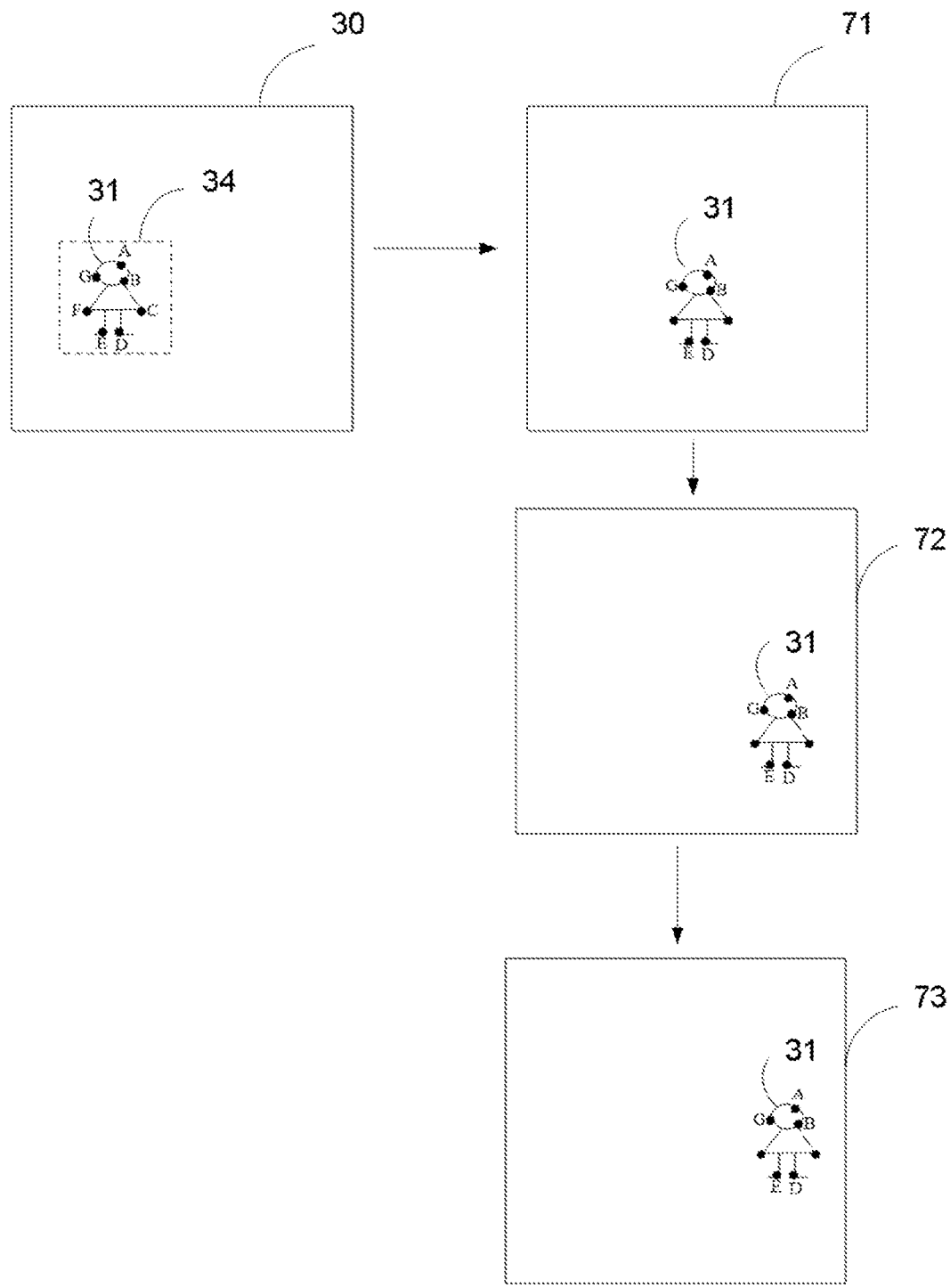
FIG. 7 is a schematic diagram of reference image tracking according to some exemplary embodiments of the present disclosure.

As shown in FIG. 7, A, B, C, D, E, F, and G may respectively represent feature points in the target area, that is, the area 34, of the reference image 30. The feature points A, B, C, D, E, F, and G may also be feature points of the target object 31. 71, 72, and 73 respectively represent first target images sequentially output by the photographic apparatus in the process in which the UAV flies around the reference object. Positions of feature points, for example, A, B, C, D, E, F, and G, of the target object 31 in the reference image 30 in the first target image 71, the first target image 72, and the first target image 73 may be separately determined according to the KLT feature tracker. For example, the photographic apparatus first outputs the reference image 30, and then sequentially outputs the first target image 71, the first target image 72, and the first target image 73. The reference image 30, the first target image 71, the first target image 72, and the first target image 73 may be adjacent images, or may be non-adjacent images.

As shown in FIG. 5, a position of the target object 31 relative to the UAV may constantly change in the process in which the UAV flies around the reference object 50, causing a position of the target object 31 in each of the first target images sequentially output by the photographic apparatus to constantly change. Therefore, positions of the feature points corresponding to the target object 31 in the first target image 71, the first target image 72, and the first target image 73 may constantly change in the corresponding first target images. This may only be an example description herein. A quantity of feature points in the area 34 is not limited, and positions of the feature points in the area 34 in each frame of the first target image are not limited.

Step S603. Determining the position information of the target object according to position information of the feature points in the corresponding first target image.

For example, position information of the target object 31 may be determined according to position information of the feature points corresponding to the target object 31 in the first target image 71, the first target image 72, and the first target image 73 in the corresponding first target images. The determined position information of the target object 31 may be three-dimensional coordinates of the target object 31 in the three-dimensional space. Herein, the position information of the target object 31 that is determined according to the position information of the feature points corresponding to the target object 31 in the first target image 71, the first target image 72, and the first target image 73 in the corresponding first target images may be denoted as first position information.

It may be understood that, after outputting the first target image 73, the photographic apparatus may further output a new first target image, and positions of the feature points of the target object 31 in the new first target image may be determined according to the KLT feature tracker. Further, another piece of position information of the target object 31 may be determined according to position information of the feature points corresponding to the target object 31 in the first target image 71, the first target image 72, the first target image 73, and the new first target image in the corresponding first target images. Herein, the position information of the target object 31 may be denoted as second position information. The first position information described above and the second position information herein may be the same or may be different. However, it may be understood that, as the photographic apparatus constantly outputs new first target images, the accuracy of position information of the target object 31 that is determined according to position information of the feature points corresponding to the target object 31 in the first target image 71, the first target image 72, the first target image 73, and first target images constantly output by the photographic apparatus subsequently in the corresponding first target images may be improved constantly. In a possible manner, each time the photographic apparatus may output a new frame of the first target image, the processor of the UAV may determine a new piece of position information of the target object 31.

In some exemplary embodiments, the determining of the position information of the target object according to position information of the feature points of each frame of first target image in the corresponding first target image may include: determining the position information of the target object based on the position information of the feature points of each frame of first target image in the corresponding first target image by using a fitting algorithm.

Figure 8:
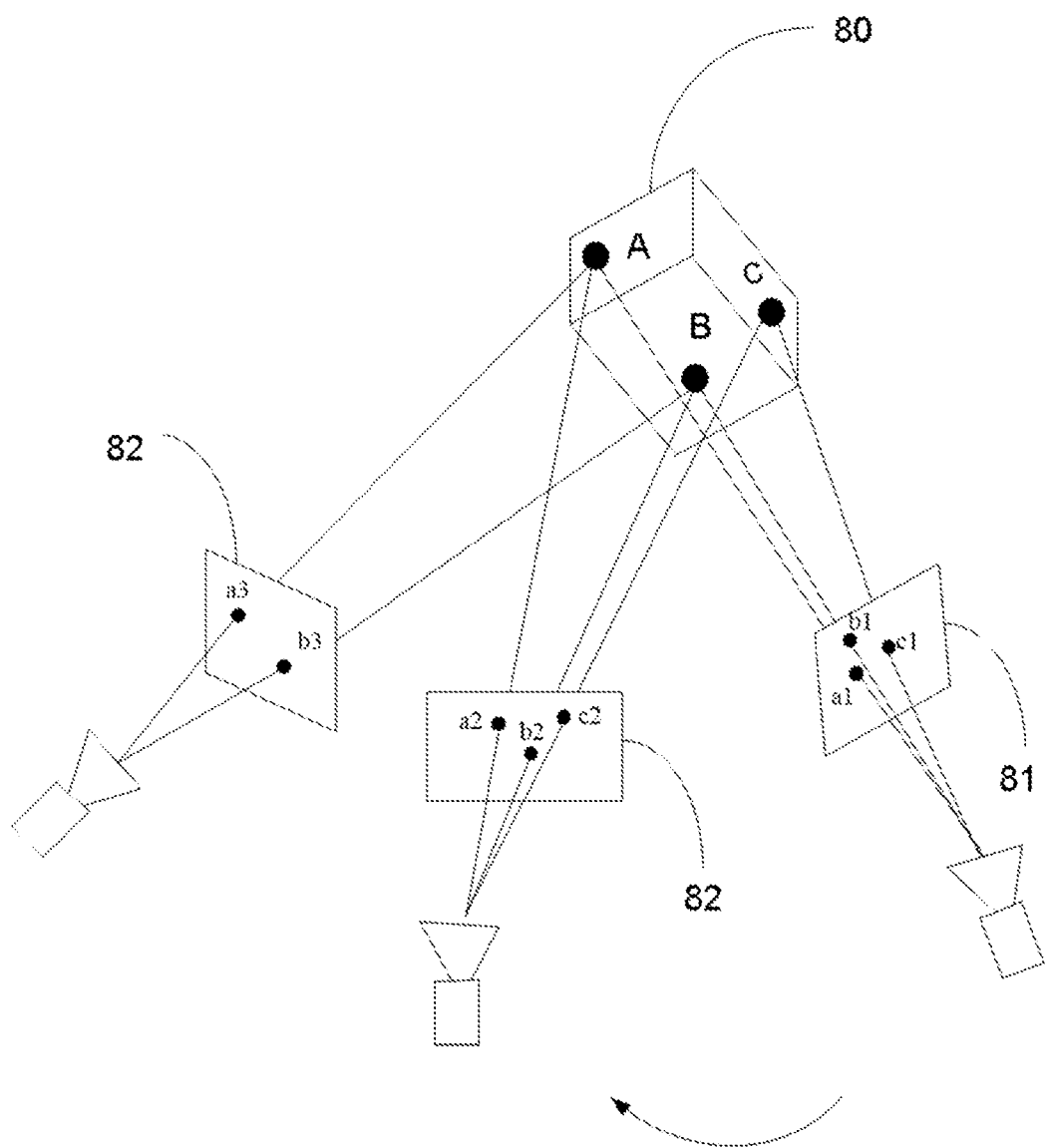
FIG. 8 is a schematic diagram of correspondence between three-dimensional coordinates and pixel coordinates according to some exemplary embodiments of the present disclosure.

As shown in FIG. 8, 80 may represent the target object, 81, 82, and 83 may represent first target images sequentially output by the photographic apparatus in a process in which the photographic apparatus moves around the target object 80 in a direction indicated by an arrow. It may be understood that, three-dimensional points of the target object 80 may be mapped to the first target images 81, 82, and 83. Mapping points of the three-dimensional points in the first target images 81, 82, and 83 may be feature points in the first target images 81, 82, and 83. In a process from the first target image 81 to the first target image 83, a number of feature points that can be tracked may be decreasing.

For example, a point A, a point B, and a point C may be separately three-dimensional points of the target object 80. A point a1, a point b1, and a point c1 may represent feature points in the first target image 81, the point a1 may correspond to the point A, the point b1 may correspond to the point B, and the point c1 may correspond to the point C. A point a2, a point b2, and a point c2 may represent feature points in the first target image 82, the point a2 may correspond to the point A, the point b2 may correspond to the point B, and the point c2 may correspond to the point C. A point a3 and a point b3 may represent feature points in the first target image 83, the point a3 may correspond to the point A, and the point b3 nay correspond to the point B. This may only be an example description herein, and the target object 80, three-dimensional points of the target object 80, and mapping points of the three-dimensional points of the target object 80 in the first target images are not limited. It may be understood that, positions of the target object 80 in different first target images may be different. Positions of mapping points of a same three-dimensional point of the target object 80 in different first target images may be also different in the corresponding first target images.

A relationship between three-dimensional coordinates $(x_w, y_w, z_w)$ of a three-dimensional point of the target object 80 in the world coordinate system and position information, for example, pixel coordinates $(\lambda, \upsilon)$, of a mapping point of the three-dimensional point in a first target image in the first target image may be obtained according to a conversion relationship between the world coordinate system and a pixel plane coordinate system. The relationship may be shown in the following formula (1):

$$z_c \begin{bmatrix} \mu \\ \upsilon \\ 1 \end{bmatrix} = K[R \mid T] \begin{bmatrix} x_w \\ y_w \\ z_w \\ 1 \end{bmatrix} \quad (1)$$

where $z_c$ may represent coordinates of the three-dimensional point on a Z axis of a camera coordinate system, K may represent an internal parameter of the camera, R represents a rotation matrix of a camera, and T represents a translation matrix of the camera. In these exemplary embodiments, $(\mu,\upsilon)$, K, R, and T are known quantities, and $z_c$ and $(x_w, y_w, z_w)$ are unknown quantities. When the photographic apparatus photographs different first target images, K does not change, and R and T may change.

In some exemplary embodiments, an equation shown in formula (1) may be established according to pixel coordinates of the point a1 in the first target image 81 and corresponding R and T that are obtained when the photographic apparatus photographs the first target image 81.

Another equation shown in formula (1) may be established according to pixel coordinates of the point a2 in the first target image 82 and corresponding R and T when the photographic apparatus photographs the first target image 82. Still another equation shown in formula (1) may be established according to pixel coordinates of the point a3 in the first target image 83 and R and T obtained when the photographic apparatus photographs the first target image 83. As the photographic apparatus constantly outputs new first target images, established equations shown in formula (1) may gradually increase. It may be understood that, when a number of equations in an equation group may be greater than a number of unknown quantities, the corresponding unknown quantities may be solved. In other words, three-dimensional coordinates of the three-dimensional point A in the world coordinate system can be calculated by using the fitting algorithm to solve the equations. Similarly, three-dimensional coordinates of each of a three-dimensional point B and a three-dimensional point C in the world coordinate system may be calculated, and details are not described herein again. It may be understood that, a larger quantity of first target images output by the photographic apparatus may indicate more accurate three-dimensional coordinates of a three-dimensional point in the world coordinate system that are obtained based on pixel coordinates of the feature points in the multiple frames of first target images by using the fitting algorithm. After three-dimensional coordinates of multiple three-dimensional points, for example, the three-dimensional points A, B, and C, of the target object 80 in the world coordinate system may be determined, three-dimensional coordinates of the target object 80 in the world coordinate system may be determined according to the three-dimensional coordinates of the three-dimensional points A, B, and C in the world coordinate system. The UAV may obtain the position information of the target object according to the three-dimensional coordinates of the target object 80 in the world coordinate system. For example, when the position information of the target object 31 may be based on a position in the coordinate system, the position information of the target object 31 may be determined according to the position information of the UAV and the three-dimensional coordinates of the target object 80 in the world coordinate system. When the position information of the target object 31 may be based on a position in the body coordinate system of the UAV, the three-dimensional coordinates of the target object 80 in the world coordinate system may be converted into coordinates in the body coordinate system to obtain position information based on the body coordinate system.

In addition, the method may further include: after the feature points of each frame of first target image are obtained, determining a target feature point meeting a preset requirement in the feature points of each frame of first target image. Correspondingly, the determining of the position information of the target object according to position information of the feature points of each frame of first target image in the corresponding first target image may include: determining the position information of the target object according to position information of the target feature point of each frame of first target image in the corresponding first target image.

As shown in FIG. 7, after the feature points, for example, A, B, C, D, E, F, and G, in the first target image 71, the first target image 72, and the first target image 73 are obtained, a target feature point meeting a preset requirement may be determined in the feature points in the first target image 71, the first target image 72, and the first target image 73. For example, an offset of each feature point between the first target image 71 and the reference image 30 may be different. It is assumed that an offset of the feature point A between the first target image 71 and the reference image 30 is denoted as h1, an offset of the feature point B between the first target image 71 and the reference image 30 is denoted as h2, ..., and an offset of the feature point G between the first target image 71 and the reference image 30 may be denoted as h7. An average value and a variance of h1, h2, ..., and h7 may be calculated. The average value may be denoted as u, and the variance may be denoted as $\delta^2$. A feature point of an offset within [u−3δ, u+3δ] may be selected according to the Gaussian distribution as a target feature point. It is assumed that h1 falls outside [u−3δ, u+3δ]. The feature point A in the first target image 71 may be deleted, and the feature points B, C, D, E, F, and G in the first target image 71 may be retained and are used as target feature points of the first target image 71. Similarly, target feature points in the first target image 72 and the first target image 73 may be calculated, and details are not described herein again.

In some exemplary embodiments, for example, after the average value and the variance of the offsets h1, h2, ..., and h7 of the feature points between the first target image 71 and the reference image 30 are calculated according to h1, h2, ..., and h7, a feature point whose offset falls within [u−3, u+3δ] may be selected as a valid point according to the Gaussian distribution. For example, if h1 falls outside [u−3, u+3δ], the feature point A in the first target image 71 may be deleted, and the feature points B, C, D, E, F, and G in the first target image 71 may be used as valid points, and a target feature point may be further determined in the valid points. A possible manner of determining a target feature point in the valid points may be calculating an average value of offsets corresponding to the valid points, that is, calculating an average value of h2, ..., and h7, and denoting the average value as u1. Herein, the position information of the area 34 in the reference image 30 may be denoted as $ROI_0$. The position information of the area 34 in the first target image 71 may be determined according to $ROI_0$ and u1 and denoted as $ROI_1$. In some exemplary embodiments, $ROI_1=ROI_0+u1$. Further, points within the area 34 and points outside the area 34 may be determined, in the valid points B, C, D, E, F, and G, according to the position information $ROI_1$ of the area 34 in the first target image 71 and position information of the valid points B, C, D, E, F, and G in the first target image 71. The points outside the area 34 in the valid point B, C, D, E, F, and G may be deleted, and the remaining valid points may be used as target feature points of the first target image 71. Similarly, target feature points in the first target image 72 and the first target image 73 may be calculated, and details are not described herein again.

After the target feature points in the first target image 71, the first target image 72, and the first target image 73 may be determined by using the foregoing method, the three-dimensional coordinates of the target object 31 in the world coordinate system may be determined according to position information of the target feature points in the corresponding first target images. A specific principle may be the same as the principle shown in FIG. 8, and details are not described herein again.

In these exemplary embodiments, the UAV may be controlled to fly around a reference object, and multiple frames of first target images output by the photographic apparatus may be obtained in a process in which the UAV flies around the reference object. Position information of a target object may be determined according to indication information of the target object and the multiple frames of first target images. When the photographic apparatus constantly outputs first target images, position information of the target object may be constantly determined according to the indication information of the target object and the first target images constantly output by the photographic apparatus, and accuracy of the position information of the target object may be increasing. In addition, after feature points of each frame of first target image output by the photographic apparatus are obtained, a target feature point meeting a preset requirement may be determined in the feature points of each frame of first target image. During the determining of the position information of the target object according to position information of the target feature point in each frame of first target image in the corresponding first target image, the accuracy of the position information of the target object may be increased. In addition, the removal of a feature point that does not meet the preset requirement may further reduce a corresponding calculation amount.

The exemplary embodiments of the present disclosure may provide a control method for a mobile robot. Based on the foregoing embodiments, the method further may include: determining, according to the position information of the feature points of each frame of first target image in the corresponding first target image, a parallax of the photographic apparatus relative to the target object during movement of the mobile robot around the reference object. Correspondingly, the controlling of the mobile robot to move around the target object according to the position information of the target object may include: when the parallax is greater than a first preset parallax threshold, determining, according to the determined position information of the target object, an orbit trajectory for the mobile robot to move around the target object, and controlling the mobile robot to move on the orbit trajectory.

As shown in FIG. 7, after the feature points, for example, A, B, C, D, E, F, and G, in the first target image 71, the first target image 72, and the first target image 73 are obtained, a parallax of the photographic apparatus of the UAV relative to the target object 31 in the process in which the UAV flies around the reference object 50 shown in FIG. 5 may be determined according to position information of the feature points A, B, C, D, E, F, and G separately in the first target image 71, the first target image 72, and the first target image 73. For example, the first target image 71 may be an image photographed by the photographic apparatus when the UAV may be at a position m1. The first target image 72 may be an image photographed by the photographic apparatus when the UAV may be at a position m2. The first target image 73 may be an image photographed by the photographic apparatus when the UAV is at a position m3. The parallax of the photographic apparatus of the UAV relative to the target object 31 in a process in which the UAV moves from the position m1 to the position m2 may be determined according to position information of the feature points A, B, C, D, E, F, and G separately in the first target image 71 and the first target image 72. In some exemplary embodiments, pixel coordinates of the feature point A in the first target image 71 may be denoted as $(\mu_1, \upsilon_1)$, and pixel coordinates of the feature point A in the first target image 72 may be denoted as $(\mu_2, \upsilon_2)$. The parallax of the feature point A may be calculated according to the following formula (2), where the parallax of the feature point A may be denoted as parallaxA:

$$parallaxA = \left\| \begin{bmatrix} \mu_1 - c_x \\ \upsilon_1 - c_y \\ f \end{bmatrix} - R_{21} \begin{bmatrix} \mu_2 - c_x \\ \upsilon_2 - c_y \\ f \end{bmatrix} \right\|_2 \quad (2)$$

where $R_{21}$ may represent a change in a rotate direction of an attitude of the camera when photographing the first target image 72 relative to an attitude of the camera when photographing the first target image 71. $C_x$ and $C_y$ each represents a position of an optical center of the camera. It may be understood that, the positions of the optical center of the camera in the first target image 71 and the first target image 72 are the same. f may represent a focal length of the camera. Similarly, parallaxes of the feature points B, C, D, E, F, and G may be calculated, and an average value of the parallaxes of the feature points A, B, C, D, E, F, and G may be calculated. The average value may be a parallax of the first target image 72. The parallax of the first target image 72 may be a parallax of the photographic apparatus of the UAV relative to the target object 31 in a process in which the UAV moves from the position m1 to the position m2.

Similarly, a parallax of the first target image 73 may be determined according to the position information of the feature points A, B, C, D, E, F, and G separately in the first target image 71 and the first target image 73. The parallax of the first target image 73 may be a parallax of the photographic apparatus of the UAV relative to the target object 31 in a process in which the UAV moves from the position m1 to the position m3. It may be understood that, as the parallax of the photographic apparatus of the UAV relative to the target object 31 continues to increase in the process in which the UAV flies along the circular trajectory 53, three-dimensional coordinates of the target object 31 may be continuously determined by using the fitting algorithm. A larger parallax may indicate higher accuracy of determined three-dimensional coordinates of the target object. When the parallax of the photographic apparatus of the UAV relative to the target object 31 is greater than the first preset parallax threshold, use of the fitting algorithm may be stopped, and newly determined three-dimensional coordinates of the target object 31, that is, accurate three-dimensional coordinates of the target object 31, may be obtained, and an orbit trajectory for the UAV to fly around the target object 31 may be determined according to the newly determined three-dimensional coordinates of the target object 31. The orbit trajectory may be different from the circular trajectory 53 for the UAV to fly around the reference object 50.

Figure 9:
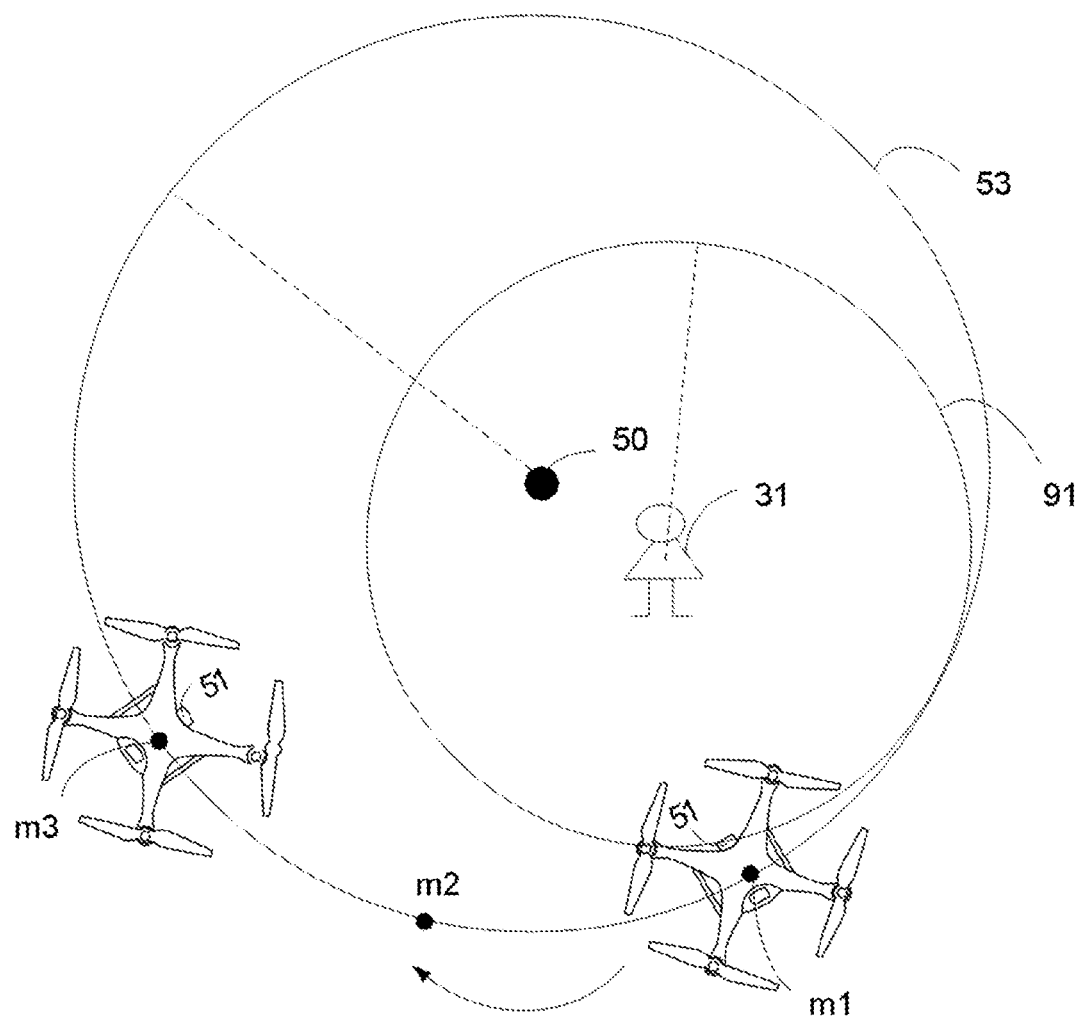
FIG. 9 is a schematic diagram showing that a UAV flies around a reference object according to some exemplary embodiments of the present disclosure.

As shown in FIG. 9, it is assumed that when the UAV flies along the circular trajectory 53 to the position m3, the parallax of the photographic apparatus of the UAV relative to the target object 31 may be greater than the first preset parallax threshold. In this case, a target trajectory 91 for the UAV to fly around the target object 31 may be determined according to the newly determined three-dimensional coordinates of the target object 31 and a preset circling parameter, for example, a circling radius, and the UAV may be controlled to fly along the target trajectory 91.

In addition, the method may further include: determining a change rate of the parallax; and adjusting, according to the change rate of the parallax, a rate at which the mobile robot moves around the reference object.

In some exemplary embodiments, the determining of the change rate of the parallax may include: determining the change rate of the parallax according to position information of feature points of two adjacent frames of first target images in multiple frames of first target images in the corresponding first target images.

For example, the first target image 71 and the first target image 72 may be two adjacent frames of first target images in the multiple frames of first target images photographed by the photographic apparatus. The parallax of the first target image 71 may be denoted as $PA_{i-1}$, a parallax of the first target image 72 may be denoted as $PA_i$, a change rate of the parallax may be denoted as parallax_speed, parallax_speed= $(PA_i-PA_{i-1})/t$, and t may represent a time interval between the first target image 71 and the first target image 72. If a frequency at which the photographic apparatus photographs a first target image is fixed, for example, 30 Hz, parallax_speed may be further represented as parallax_speed= $(PA_i-PA_{i-1})$. In other words, when an image frequency is fixed, measuring $(PA_i-PA_{i-1})/t$ may be equivalent to measuring $PA_i-PA_{i-1}$.

In some exemplary embodiments, when the UAV starts to fly along the circular trajectory 53, the UAV may fly at a preset lower speed, for example, 2 m/s. However, if the target object 31 is far away from the UAV, after the UAV flies along the circular trajectory 53 for a long time, a position of the target object 31 in the first target image photographed by the photographic apparatus may change little or hardly change. In this case, a flight rate at which the UAV flies along the circular trajectory 53 may be adjusted according to a change rate of the parallax. For example, the first preset parallax threshold may be denoted as T1. It is assumed that T1=20, and the UAV may need to determine the three-dimensional coordinates of the target object 31 within, for example, t=2 seconds, after the UAV starts to fly along the circular trajectory 53; in other words, the parallax of the photographic apparatus of the UAV relative to the target object 31 may need to reach the first preset parallax threshold T1 within t=2 seconds. In this case, an expected change rate of the parallax may be T1/t=10. It is assumed that current parallax_speed may be calculated to be 2.5 according to parallax_speed=$(PA_i-PA_{i-1})$, the flight rate of the UAV may need to be increased. A flight rate that the UAV needs to reach may be equal to a current flight rate of the UAV multiplied by a result obtained by dividing the expected change rate of the parallax by the current parallax_speed, that is, 2 m/s*(10/2.5)=8 m/s. In other words, the flight rate of the UAV may need to be increased to 8 m/s.

In addition, the method may further include: when the parallax is greater than a second preset parallax threshold, adjusting a radius of the movement of the mobile robot around the reference object according to the determined position information of the target object, where the first preset parallax threshold may be greater than the second preset parallax threshold.

As shown in FIG. 9, if the parallax of the photographic apparatus of the UAV relative to the target object 31 is greater than the first preset parallax threshold when the UAV flies along the circular trajectory 53 to the position m3, a target trajectory 91 for the UAV to fly around the target object 31 may be determined according to the newly determined three-dimensional coordinates of the target object 31. However, at this time, the UAV may be far away from the target trajectory 91, and the UAV may need to first fly from a current position, for example, the position m3, to a point on the target trajectory 91, and then starts to fly along the target trajectory 91.

Figure 10:
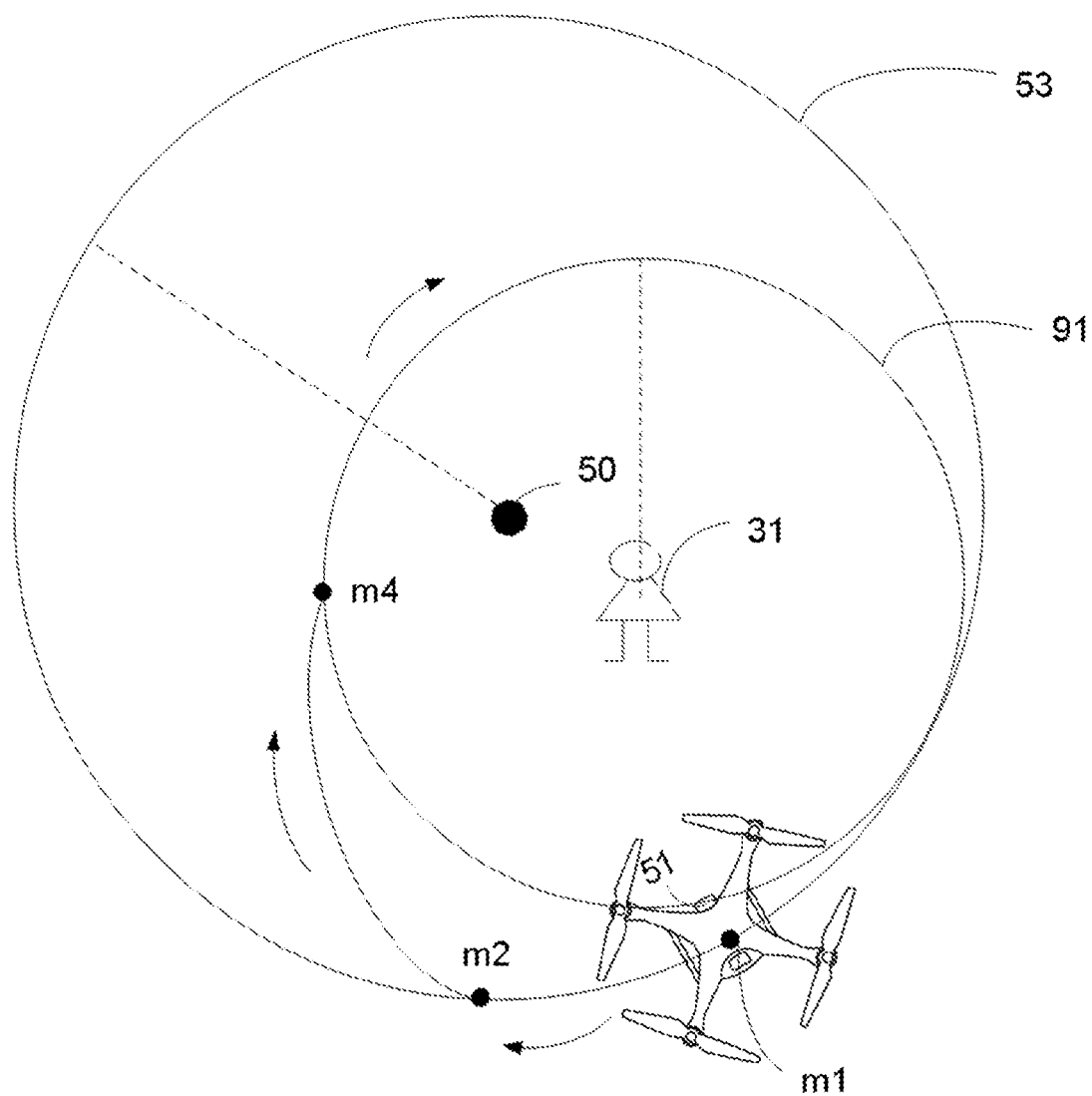
FIG. 10 is a schematic diagram showing that a UAV flies around a target object according to some exemplary embodiments of the present disclosure.

In another manner, as shown in FIG. 10, it is assumed that the parallax of the photographic apparatus of the UAV relative to the target object 31 is greater than a second preset parallax threshold when the UAV flies along the circular trajectory 53 to the position m2, and the second preset parallax threshold is less than the first preset parallax threshold. In this case, three-dimensional coordinates of the target object 31, that is, rough three-dimensional coordinates of the target object 31, may be determined by using the fitting algorithm, and a target trajectory 91, that is, a rough target trajectory 91, for the UAV to fly around the target object 31 may be determined according to the three-dimensional coordinates of the target object 31 and a preset circling parameter, for example, a circling radius. In this case, from the position m2, a radius of the flight of the UAV around the reference object 50 may be continuously adjusted. For example, the radius of the flight of the UAV around the reference object 50 may be continuously reduced. During the flight of the UAV around the reference object 50 with a decreasing circling radius, the parallax of the photographic apparatus of the UAV relative to the target object 31 may be still changing. When the parallax of the photographic apparatus of the UAV relative to the target object 31 is greater than the first preset parallax threshold, the UAV may arrive at a point, for example, m4, on the target trajectory 91 (an accurate target trajectory), or the UAV may arrive at a point relatively close to the target trajectory 91, so that the UAV can smoothly transition to the target trajectory 91 from the point.

In these exemplary embodiments, a parallax of the photographic apparatus relative to a target object during the flight of the UAV around a reference object may be determined according to position information of feature points of each frame of first target image in the corresponding first target image, and a flight rate at which the UAV flies around the reference object may be adjusted according to a change rate of the parallax, so that the UAV may determine three-dimensional coordinates of the target object within a relatively short time. Particularly, when the target object is far away from the UAV, and the flight rate at which the UAV flies around the reference object may be relatively low, the flight rate of the UAV can be increased according to the change rate of the parallax, thereby improving the efficiency of calculating the three-dimensional coordinates of the target object. In addition, at least two parallax thresholds, for example, a first preset parallax threshold and a second preset parallax threshold, may be set, where the first preset parallax threshold may be greater than the second preset parallax threshold. When the parallax is greater than the second preset parallax threshold, a radius for the UAV to fly around the reference object may be adjusted, so that when the parallax is greater than the first preset parallax threshold, the UAV may arrive at a position on an orbit trajectory for flying around the target object, or arrives at a position relatively close to the orbit trajectory. In this way, the UAV can smoothly transition from an orbit trajectory for flying around the reference object to the orbit trajectory for flying around the target object.

Figure 11:
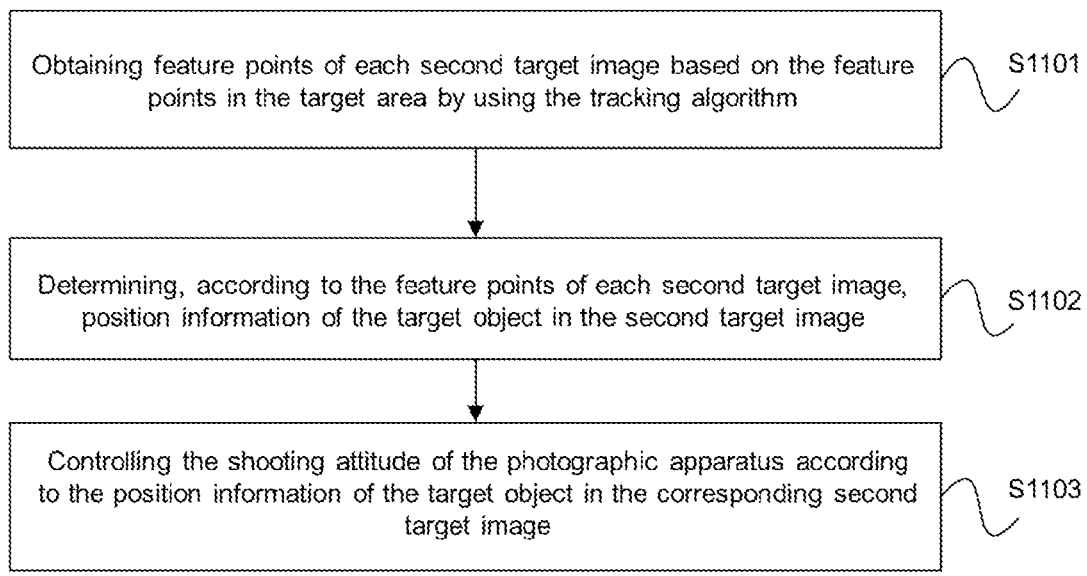
FIG. 11 is a flowchart of a control method for a mobile robot according to some exemplary embodiments of the present disclosure.

The exemplary embodiments of the present disclosure provide a control method for a mobile robot. FIG. 11 is a flowchart of a control method for a mobile robot according to some exemplary embodiments of the present disclosure. As shown in FIG. 11, based on the foregoing embodiment, the method may further include: controlling a shooting attitude of the photographic apparatus according to the indication information, so that the target object may be at a center of a shooting screen of the photographic apparatus.

As shown in FIG. 3, when the user box-selects the target object 31 from the reference image 30, the target object 31 may not be at the center of a shooting screen of the photographic apparatus. In these exemplary embodiments, after obtaining the indication information of the target object 31, for example, after receiving position information that is of the area 34 in the reference image 30 and that is sent by the control terminal 24, the UAV may determine an angle of the target object 31 relative to the optical axis of the photographic apparatus 21 according to the position information of the area 34 in the reference image 30, and may adjust an attitude of the UAV and/or an attitude of the gimbal according to the angle, to control a shooting attitude of the photographic apparatus, so that the angle of the target object 31 relative to the optical axis of the photographic apparatus may be 0, that is, the target object 31 may be at the center of the shooting screen of the photographic apparatus.

In some exemplary embodiments, the UAV may fly around the reference object after the user box-selects the target object 31. Therefore, the attitude of the UAV and/or the attitude of the gimbal may be adjusted after the UAV obtains the indication information of the target object 31, so that the target object 31 may be at the center of the shooting screen of the photographic apparatus. In other words, the attitude of the UAV and/or the attitude of the gimbal may be adjusted during the flight of the UAV around the reference object, so that the target object 31 may be at the center of the shooting screen of the photographic apparatus until the UAV determines the three-dimensional coordinates of the target object 31.

In some exemplary embodiments, after the user box-selects the target object 31, the UAV may not immediately fly around the reference object. Instead, the UAV may start to fly around the reference object after the user taps the start control button 35 in the interactive interface. For example, the UAV may obtain the indication information of the target object at a moment t1. The user may tap the start control button 35 at a moment t2 after the moment t1. In other words, the UAV may start to fly around the reference object at the moment t2. The UAV may determine the three-dimensional coordinates of the target object 31 at a moment t3 after the moment t2.

In some exemplary embodiments, the UAV may adjust the attitude of the UAV and/or the attitude of the gimbal between the moment t1 and the moment t2, so that the target object 31 may be at the center of the shooting screen of the photographic apparatus. The UAV may not move between the moment t1 and the moment t2, but the target object 31 moves. Therefore, the position of the target object 31 in the shooting screen of the photographic apparatus changes. In some exemplary embodiments, the UAV may adjust the attitude of the UAV and/or the attitude of the gimbal between the moment t2 and the moment t3, so that the target object 31 may be at the center of the shooting screen of the photographic apparatus. In some exemplary embodiments, the UAV may adjust the attitude of the UAV and/or the attitude of the gimbal between the moment t1 and the moment t3, so that the target object 31 may be at the center of the shooting screen of the photographic apparatus.

In addition, the method may further include: after the indication information is obtained, obtaining multiple frames of second target images output by the photographic apparatus, where the second target image may include the target object.

For example, after the user box-selects the target object 31, that is, after the UAV obtains the indication information of the target object 31, the UAV may start to fly around the reference object. During the flight of the UAV around the reference object, the multiple frames of second target images output by the photographic apparatus may be obtained. In this case, the multiple frames of second target images include the multiple frames of the first target images.

For another example, after the user box-selects the target object 31, the UAV does not immediately fly around the reference object. Instead, the UAV starts to fly around the reference object after the user taps the start control button 35 in the interactive interface. In this case, after the UAV obtains the indication information of the target object 31, the multiple frames of second target images output by the photographic apparatus may be photographed by the photographic apparatus between the moment t1 and the moment t2, or may be photographed between the moment t2 and the moment t3, or may be photographed between the moment t1 and the moment t3. In other words, the multiple frames of second target images include at least multiple frames of first target images.

Correspondingly, the controlling of the shooting attitude of the photographic apparatus according to the indication information may include the following steps.

Step S1101. Obtaining feature points of each second target image based on the feature points in the target area by using the tracking algorithm.

In some exemplary embodiments, an offset of each feature point between adjacent target images, for example, second target images, in the target area may be calculated by using the tracking algorithm. If an offset of the feature point in a previous frame of the target image relative to a next frame of the target image and an offset of the feature point in the next frame of the target image relative to the previous frame of the target image may be equal in value and opposite in direction, it may be determined that the feature point is a correctly tracked feature point.

Figure 12:
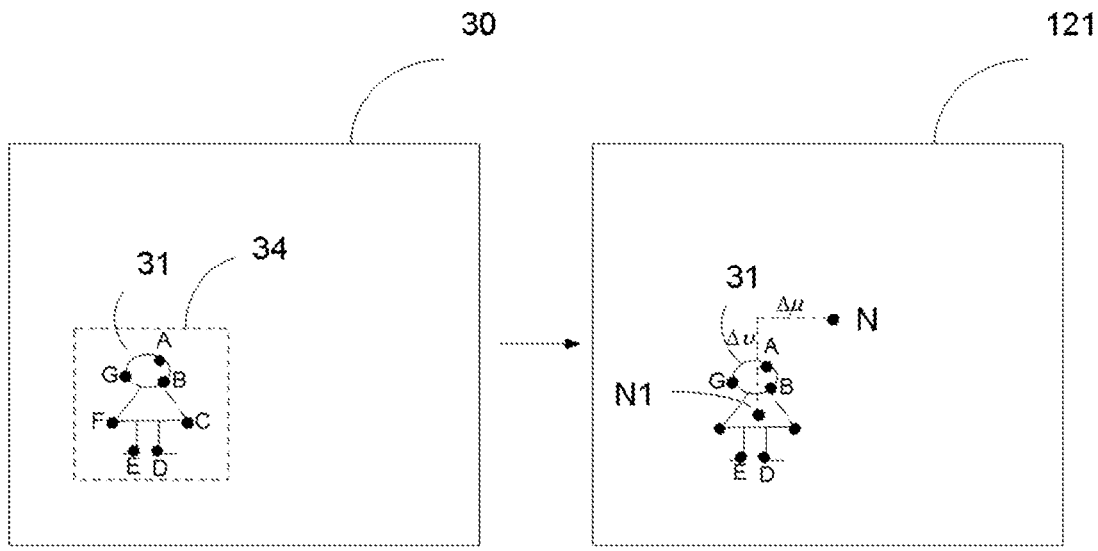
FIG. 12 is a schematic diagram of reference image tracking according to some exemplary embodiments of the present disclosure.

As shown in FIG. 12, A, B, C, D, E, F, and G may respectively represent feature points in the target area, that is, the area 34, of the reference image 30. The feature points A, B, C, D, E, F, and G may also be feature points of the target object 31. 121 may represent a second target image in the multiple frames of second target images output by the photographic apparatus after the UAV obtains the indication information. This may only be an example description herein. Positions of feature points, for example, A, B, C, D, E, F, and G, of the target object 31 in the reference image 30 in the second target image 121 may be separately determined according to the KLT feature tracker.

Step S1102. Determining, according to the feature points of each second target image, position information of the target object in the second target image.

Position information of the target object 31 in the second target image 121, for example, position information of a center point N1 of the target object 31 in the second target image 121, may be determined according to the positions of the feature points, for example, A, B, C, D, E, F, G in the second target image 121.

Step S1103. Controlling the shooting attitude of the photographic apparatus according to the position information of the target object in the corresponding second target image.

A distance $\Delta\mu$ of the center point N1 of the target object 31 relative to a center point N of the second target image 121 in the horizontal direction and a distance $\Delta\upsilon$ of the center point N1 of the target object 31 relative to the center point N of the second target image 121 in the vertical direction may be determined according to the position information of the center point N1 of the target object 31 in the second target image 121 and position information of the center point N of the second target image 121. Further, an angle at which the target object 31 may be offset relative to the optical axis of the photographic apparatus in the horizontal direction may be determined according to Δμ and the FOV of the photographic apparatus in the horizontal direction. An angle at which the target object 31 may be offset relative to the optical axis of the photographic apparatus in the vertical direction may be determined according to Δυ and the FOV of the photographic apparatus in the vertical direction. According to the angles at which the target object 31 may be offset relative to the optical axis of the photographic apparatus in the horizontal direction and the vertical direction respectively, the shooting attitude of the photographic apparatus may be adjusted by adjusting the attitude of the UAV and/or the attitude of the gimbal, so that the optical axis of the photographic apparatus may be aligned with the target object 31, and the target object 31 may be located at a center of the second target image 121.

In some exemplary embodiments, the target object 31 may not be limited to being adjusted to the center of the first target image or the second target image. Instead, the target object 31 may alternatively be adjusted to a preset area in the first target image or the second target image. In other words, by adjusting the attitude of the UAV and/or the attitude of the gimbal, the angles at which the target object 31 may be offset relative to the optical axis of the photographic apparatus in the horizontal direction and the vertical direction respectively are both non-zero preset angles.

In these exemplary embodiments, a shooting attitude of the photographic apparatus may be controlled, so that a target object may be at a center of a shooting screen of the photographic apparatus. This may avoid improper determining of three-dimensional coordinates of the target object caused by the movement of the target object out of the shooting screen of the photographic apparatus when the UAV flies around a reference object. In addition, the target object may be prevented from disappearing from the shooting screen of the photographic apparatus during the movement.

Figure 13:
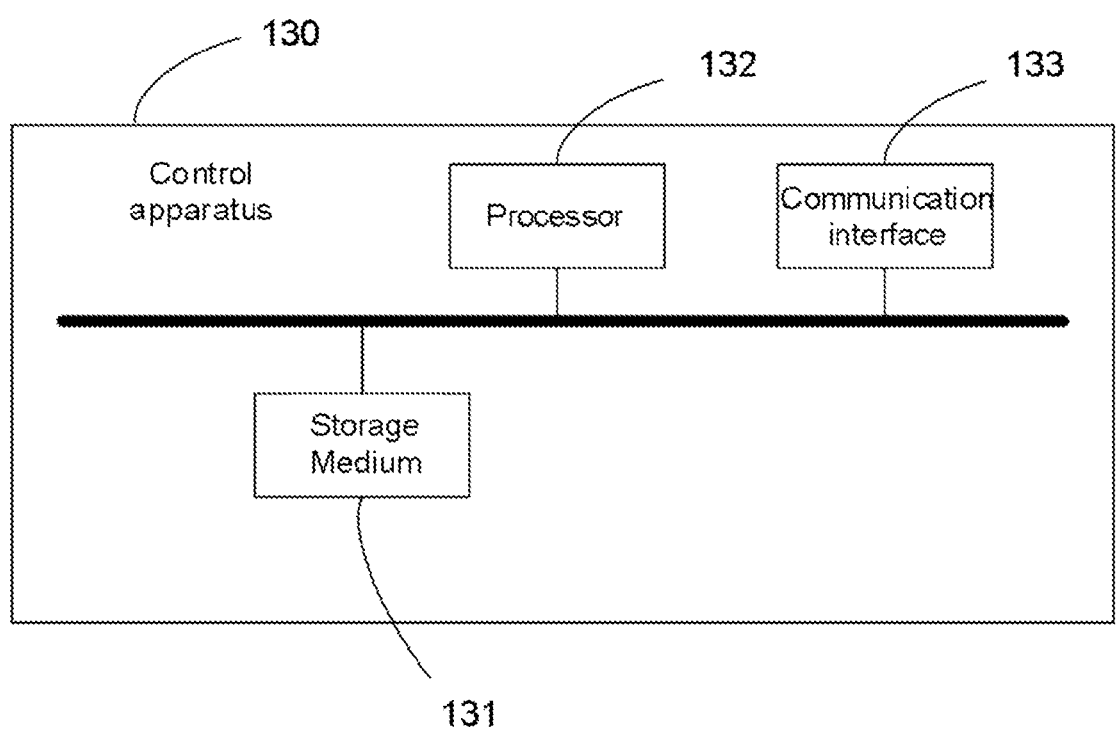
FIG. 13 is a structural diagram of a control apparatus for a mobile robot according to some exemplary embodiments of the present disclosure.

The exemplary embodiments of the present disclosure provide a control apparatus for a mobile robot. FIG. 13 may be a structural diagram of a control apparatus for a mobile robot according to some exemplary embodiments of the present disclosure. The mobile robot may include a photographic apparatus. As shown in FIG. 13, the control apparatus 130 for a mobile robot may include at least one storage medium 131 and at least one processor 132 in communication with the at least one storage medium 131. The processor may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also be one or more special-purpose processing devices such as an application-specific integrated circuit (ASIC), a field-programmable gate array (FPGA), a digital signal processor (DSP), network processor, or the like. The processor may represent one or more general-purpose processing devices such as a microprocessor, central processing unit, or the like. The at least one storage medium 131 may be configured to store a set of program code for controlling a mobile robot. During operation, the at least one processor 132 may execute the set of program codes to: obtain indication information of a target object, wherein the indication information includes position information of the target object in a reference image output by a photographic apparatus of a mobile robot; determine the position information of the target object according to the indication information; and controlling, according to the position information of the target object, the mobile robot to move around the target object.

In some exemplary embodiments, the control apparatus 130 further may include a communication interface 133. The communication interface 133 may be connected to or in communication with the at least one processor 132. When obtaining the indication information of the target object, the at least one processor 132 may be configured to: receive indication information sent by a control terminal, which receives a selection operation of the target object from a user via an interactive interface displaying the reference image.

In some exemplary embodiments, when determining the position information of the target object according to the indication information, the at least one processor 132 may be configured to: control the mobile robot to move around a reference object; during the movement of the mobile robot around the reference object, obtain multiple frames of first target images output by the photographic apparatus, where the first target image may include the target object; and determine the position information of the target object according to the indication information of the target object and the multiple frames of first target images.

In some exemplary embodiments, when determining the position information of the target object according to the indication information of the target object and the multiple frames of first target images, the at least one processor 132 may be configured to: obtain feature points in a target area of the reference image, where the target area may be an image area indicated by the indication information in the reference image; obtain feature points of each frame of first target image based on the feature points in the target area of the reference image by using a tracking algorithm; and determine the position information of the target object according to position information of the feature points of each frame of first target image in the corresponding first target image.

In some exemplary embodiments, when determining the position information of the target object according to position information of the feature points of each frame of first target image in the corresponding first target image, the at least one processor 132 may be configured to: determine the position information of the target object based on the position information of the feature points of each frame of first target image in the corresponding first target image by using a fitting algorithm.

In some exemplary embodiments, the at least one processor 132 may be further configured to: after obtaining the feature points of each frame of the first target image, determine a target feature point meeting a preset requirement in the feature points of each frame of the first target image. When determining the position information of the target object according to position information of the feature points of each frame of the first target image in the corresponding first target image, the at least one processor 132 may be configured to: determine the position information of the target object according to position information of the target feature point of each frame of first target image in the corresponding first target image.

In some exemplary embodiments, the at least one processor 132 may be further configured to determine, according to the position information of the feature points of each frame of first target image in the corresponding first target image, a parallax of the photographic apparatus relative to the target object during movement of the mobile robot around the reference object. When controlling, according to the position information of the target object, the mobile robot to move around the target object, the at least one processor 132 may be configured to: when the parallax may be greater than a first preset parallax threshold, determine, according to the determined position information of the target object, an orbit trajectory for the mobile robot to move around the target object, and control the mobile robot to move on the orbit trajectory.

In some exemplary embodiments, the at least one processor 132 may be further configured to: determine a change rate of the parallax; and adjust, according to the change rate of the parallax, a rate at which the mobile robot moves around the reference object.

In some exemplary embodiments, when determining the change rate of the parallax, the at least one processor 132 may be configured to determine the change rate of the parallax according to position information of feature points of two adjacent frames of first target images in multiple frames of first target images in the corresponding first target images.

In some exemplary embodiments, the at least one processor 132 may be further configured to: when the parallax may be greater than a second preset parallax threshold, adjust a radius of the movement of the mobile robot around the reference object according to the determined position information of the target object, where the first preset parallax threshold may be greater than the second preset parallax threshold.

In some exemplary embodiments, when controlling the mobile robot to move around the reference object, the at least one processor 132 may be configured to: determine the reference object according to a preset circling radius, and control the mobile robot to move around the reference object.

In some exemplary embodiments, when controlling the mobile robot to move around the reference object, the at least one processor 132 may be configured to: after a start control instruction sent by the control terminal may be received, control the mobile robot to move around the reference object.

In some exemplary embodiments, the at least one processor 132 may further be configured to: after the indication information may be obtained, control a shooting attitude of the photographic apparatus according to the indication information, so that the target object may be at a center of a shooting screen of the photographic apparatus.

In some exemplary embodiments, the at least one processor 132 may further be configured to: after the indication information may be obtained, obtain multiple frames of second target images output by the photographic apparatus, where the second target image may include the target object. When controlling the shooting attitude of the photographic apparatus according to the indication information, the at least one processor 132 may be configured to: obtain feature points of each frame of second target image based on the feature points in the target area of the reference image by using the tracking algorithm; determine position information of the target object in the corresponding second target image according to the feature points of each frame of second target image; and control the shooting attitude of the photographic apparatus according to the position information of the target object in the corresponding second target image.

In some exemplary embodiments, the multiple frames of second target images may include the multiple frames of first target images.

The specific principle and implementations of the control apparatus for a mobile robot provided in these exemplary embodiments of the present disclosure may be similar to those in the foregoing embodiment, and details are not described herein again.

In these exemplary embodiments, position information of a target object photographed by a photographic apparatus in a reference image output by the photographic apparatus may be obtained, the position information of the target object may be determined, and a mobile robot may be controlled, according to the position information of the target object, to move around the target object, so that the mobile robot can move around the target object without needing to move to a circling center to record a position of the circling center, thereby simplifying a process in which the mobile robot moves around the target object, and improving operation security of the mobile robot.

Figure 14:
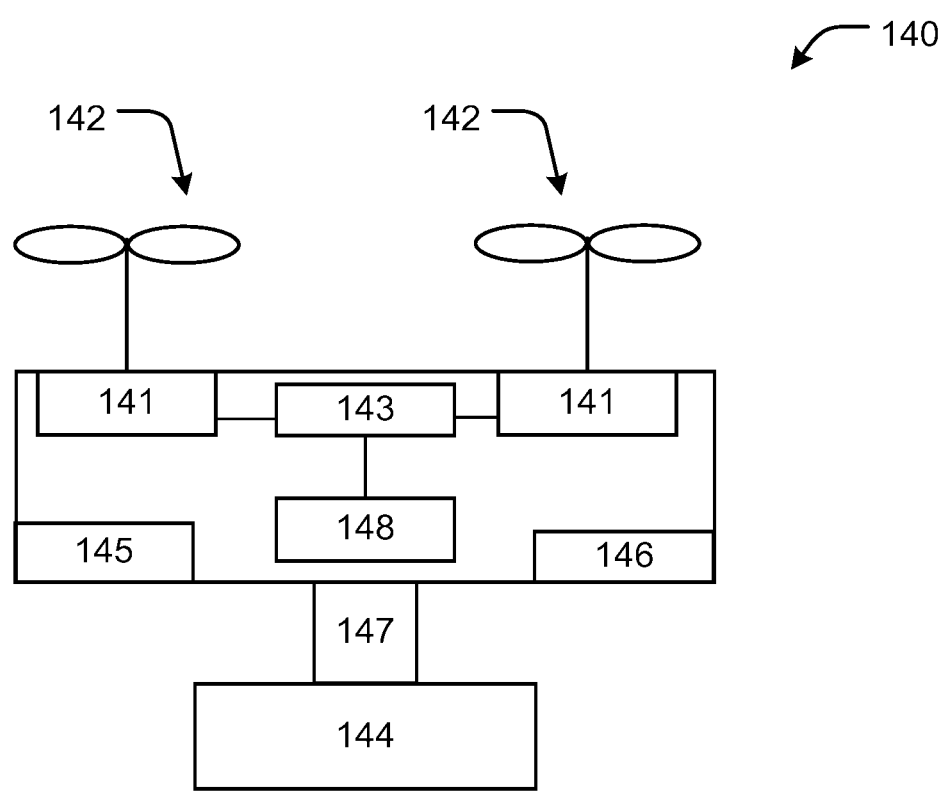
FIG. 14 is a structural diagram of a UAV according to some exemplary embodiments of the present disclosure.

Exemplary embodiments of the present disclosure provide a mobile robot. The mobile robot may be a UAV. FIG. 14 may be a structural diagram of a UAV according to some exemplary embodiments of the present disclosure. As shown in FIG. 14, the UAV 140 may include a body, a power system, a photographic apparatus 144, and a control apparatus 148. The power system may include at least one of the following: a motor 141, a propeller 142, and an electronic speed regulator 143. The power system may be mounted on the body, and configured to provide power. The specific principle and implementations of the control apparatus 148 are similar to those in the foregoing embodiment, and details are not described herein again.

In addition, as shown in FIG. 14, the UAV 140 may further include a sensing system 145, a communication system 146, and a support device 147. The support device 147 may be a gimbal. The photographic apparatus 144 may be mounted on the UAV 140 through the support device 147.

In some exemplary embodiments, the control apparatus 148 may be a flight controller of the UAV 140.

In these exemplary embodiments, position information of a target object photographed by a photographic apparatus in a reference image output by the photographic apparatus may be obtained, the position information of the target object may be determined, and a mobile robot may be controlled, according to the position information of the target object, to move around the target object, so that the mobile robot can move around the target object without needing to move to a circling center to record a position of the circling center, thereby simplifying a process in which the mobile robot moves around the target object, and improving operation security of the mobile robot.

The exemplary embodiments of the present disclosure may further provide a computer-readable storage medium, storing a computer program. The computer program may be executed by a processor to implement the control method for a mobile robot described above.

In the several exemplary embodiments provided in the present disclosure, it should be understood that the disclosed apparatus and method may be implemented in other manners. For example, the described apparatus embodiment may be merely an example. For example, the unit division may be merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the exemplary embodiments.

In addition, functional units in the exemplary embodiments of the present disclosure may be integrated into one processing unit, or each of the units may exist alone physically, or two or more units may be integrated into one unit. The integrated unit may be implemented in a form of hardware or may be implemented in a form of hardware plus software functional units.

The integrated unit implemented in the form of a software functional unit may be stored in a computer-readable storage medium. The software functional unit may be stored in a storage medium and may include instructions to cause a computer device (which may be a personal computer, a server, a network device, or the like) or a processor to perform some of the steps of the methods described in the exemplary embodiments of the present disclosure. The foregoing storage medium may include any medium that can store program code, such as a USB flash drive, a removable hard disk, a read-only memory (ROM), a random access memory (RAM), a magnetic disk, or an optical disc.

Those skilled in the art can clearly understand that, for convenience and conciseness of description, only the division of the foregoing function modules may be used as an example. In practical applications, the foregoing functions may be allocated to and completed by different function modules as required, that is, an internal structure of the apparatus may be divided into different function modules to complete all or some of the functions described above. For a specific working process of the apparatus described above, refer to the corresponding process in the foregoing method embodiment. Details are not described herein again.

Finally, it should be noted that the foregoing exemplary embodiments are intended only to illustrate and not to limit the technical solutions of the present disclosure. Although the present disclosure has been described in detail with reference to the foregoing exemplary embodiments, those of ordinary skill in the art should understand that they can still modify the technical solutions described in the foregoing exemplary embodiments, or equivalently replace some or all of the technical features therein. These modifications or replacements do not make the essence of the corresponding technical solutions deviate from the scope of the technical solutions of the exemplary embodiments of the present disclosure.

The invention claimed is:

1. A control method for a mobile robot, comprising:
obtaining indication information of a target object, wherein the indication information includes position information of the target object in a reference image output by a photographic apparatus of a mobile robot;
determining the position information of the target object according to the indication information; and
controlling, according to the position information of the target object, the mobile robot to move around the target object, wherein
the controlling of the mobile robot to move around the target object includes: when a parallax of the photographic apparatus is greater than a first preset parallax threshold, determining, according to the position information of the target object, an orbit trajectory for the mobile robot to move around the target object, and controlling the mobile robot to move on the orbit trajectory.

2. The control method according to claim 1, wherein the obtaining of the indication information of the target object includes:
receiving the indication information from a control terminal, which receives a selection operation of the target object from a user via an interactive interface displaying the reference image.

3. The control method according to claim 1, wherein the determining of the position information of the target object according to the indication information includes:
controlling the mobile robot to move around a reference object;
during movement of the mobile robot around the reference object, obtaining multiple first target images output by the photographic apparatus, wherein each image of the multiple first target images include the target object; and
determining the position information of the target object according to the indication information of the target object and the multiple first target images.

4. The control method according to claim 3, wherein the determining of the position information of the target object according to the indication information and the multiple first target images includes:
obtaining feature points in a target area of the reference image, wherein the target area is an image area in the reference image indicated by the indication information;
for each first target image of the multiple first target images:
obtaining feature points of the first target image based on the feature points in the target area by using a tracking algorithm; and
determining the position information of the target object according to position information of the feature points in the first target image.

5. The control method according to claim 4, wherein the determining of the position information of the target object includes:
determining the position information of the target object based on the position information of the feature points of the corresponding first target image by using a fitting algorithm.

6. The control method according to claim 4, further comprising:
after the feature points of each first target image of the multiple first target image are obtained, determining a target feature point meeting a preset requirement in the feature points of the corresponding first target image,
the determining of the position information of the target object according to position information of the feature points of the corresponding first target image includes:
determining the position information of the target object according to position information of the target feature point in the corresponding first target image.

7. The control method according to claim 4, further comprising:
determining, according to the position information of the feature points of each corresponding first target image, the parallax of the photographic apparatus relative to the target object during movement of the mobile robot around the reference object.

8. The control method according to claim 7, further comprising:
   determining a change rate of the parallax; and
   adjusting, according to the change rate of the parallax, a rate at which the mobile robot moves around the reference object.

9. The control method according to claim 8, wherein the determining of the change rate of the parallax includes:
   determining the change rate of the parallax according to position information of feature points of two adjacent first target images in the multiple first target images.

10. The control method according to claim 7, further comprising:
    when the parallax is greater than a second preset parallax threshold, adjusting a radius of the movement of the mobile robot around the reference object according to the determined position information of the target object,
    wherein the first preset parallax threshold is greater than the second preset parallax threshold.

11. The control method according to claim 4, further comprising:
    after obtaining the indication information, controlling a shooting attitude of the photographic apparatus according to the indication information, so that the target object is at a center of a shooting screen of the photographic apparatus.

12. The control method according to claim 11, further comprising:
    after obtaining the indication information, obtaining multiple second target images output by the photographic apparatus, wherein the multiple second target images include the target object,
    the controlling of the shooting attitude of the photographic apparatus according to the indication information includes, for each second target image of the multiple second target images:
      obtaining feature points of the second target image based on the feature points in the target area by using the tracking algorithm;
      determining position information of the target object in the second target image according to the feature points of the second target image; and
      controlling the shooting attitude of the photographic apparatus according to the position information of the target object in the second target image.

13. The control method according to claim 12, wherein the multiple second target images include the multiple first target images.

14. The control method according to claim 3, wherein the controlling of the mobile robot to move around a reference object includes:
    determining the reference object according to a preset circling radius, and
    controlling the mobile robot to move around the reference object.

15. The control method according to claim 3, wherein the controlling of the mobile robot to move around a reference object includes:
    after receiving a start control instruction from the control terminal, controlling the mobile robot to move around the reference object.

16. A control apparatus for a mobile robot, comprising:
    at least one storage medium storing a set of program code for controlling a mobile robot; and
    at least one processor in communication with the at least one storage medium, wherein during operation the at least one processor executes the set of program codes to:
      obtain indication information of a target object, wherein the indication information includes position information of the target object in a reference image output by a photographic apparatus of a mobile robot;
      determine the position information of the target object according to the indication information; and
      controlling, according to the position information of the target object, the mobile robot to move around the target object, wherein
      the controlling of the mobile robot to move around the target object includes: when a parallax of the photographic apparatus is greater than a first preset parallax threshold, determining, according to the determined position information of the target object, an orbit trajectory for the mobile robot to move around the target object, and controlling the mobile robot to move on the orbit trajectory.

17. The control apparatus according to claim 16, further comprising:
    a communication interface in communication with the at least one processor, wherein to obtain the indication information of the target object, the at least one processor further executes the set of program codes to:
    receive the indication information determined by a control terminal, which receives a selection operation of the target object from a user via an interactive interface displaying the reference image.

18. The control apparatus according to claim 16, wherein to determine the position information of the target object according to the indication information, the at least one processor further executes the set of program code to:
    control the mobile robot to move around a reference object;
    during movement of the mobile robot around the reference object, obtain multiple first target images output by the photographic apparatus, wherein each image of the multiple the first target images include the target object; and
    determine the position information of the target object according to the indication information of the target object and the multiple first target images.

19. The control apparatus according to claim 18, wherein to determine the position information of the target object according to the indication information of the target object and the multiple first target images, the at least one processor further executes the set of program codes to:
    obtain feature points in a target area of the reference image, wherein the target area is an image area in the reference image indicated by the indication information;
    for each first target image of the multiple first target images:
      obtain feature points of the first target image based on the feature points in the target area by using a tracking algorithm; and
      determine the position information of the target object according to position information of the feature points of the corresponding first target image.

20. The control apparatus according to claim 19, wherein to determine the position information of the target object, the at least one processor further executes the set of program codes to:

determine the position information of the target object based on the position information of the feature points of the corresponding first target image by using a fitting algorithm.

* * * * *